(12) United States Patent
Kobayashi

(10) Patent No.: US 10,711,878 B2
(45) Date of Patent: Jul. 14, 2020

(54) DRIVE UNIT FOR STRADDLED VEHICLE

(71) Applicant: YAMAHA HATSUDOKI KABUSHIKI KAISHA, Iwata-shi, Shizuoka (JP)

(72) Inventor: Makoto Kobayashi, Iwata (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 17 days.

(21) Appl. No.: 15/954,377

(22) Filed: Apr. 16, 2018

(65) Prior Publication Data

US 2018/0231116 A1    Aug. 16, 2018

Related U.S. Application Data

(63) Continuation-in-part of application No. PCT/JP2016/080557, filed on Oct. 14, 2016.

(30) Foreign Application Priority Data

Oct. 16, 2015 (JP) .................. 2015-204557

(51) Int. Cl.
 *F16H 57/04* (2010.01)
 *F01M 1/02* (2006.01)
 (Continued)

(52) U.S. Cl.
 CPC ........... *F16H 57/0475* (2013.01); *B62M 7/02* (2013.01); *F01L 1/2422* (2013.01); *F01L 1/3442* (2013.01); *F01M 1/02* (2013.01); *F01M 11/02* (2013.01); *F02F 7/0021* (2013.01); *F16H 7/08* (2013.01); *F16H 57/0441* (2013.01); *F01L 2001/2444* (2013.01); *F01L 2001/34423* (2013.01); *F01L 2250/02* (2013.01); *F01M 2001/0269* (2013.01);
 (Continued)

(58) Field of Classification Search
 CPC .......... F01M 11/02; F01M 5/002; F01M 1/02; F01M 2001/123; F01L 2810/02; F01L 1/2422; F16H 57/0475
 USPC ............................ 123/196 R, 196 AB, 198 C
 See application file for complete search history.

(56) References Cited

U.S. PATENT DOCUMENTS 3,542,001 A * 11/1970 Line ...................... F01L 1/2405
 123/90.43
4,248,293 A * 2/1981 Kamezaki ................ F01M 1/10
 123/196 AB
(Continued)

FOREIGN PATENT DOCUMENTS

EP         0275715 A1    7/1988
JP       H07-091220 A    4/1995
 (Continued)

*Primary Examiner* — Patrick Hamo
*Assistant Examiner* — Wesley G Harris
(74) *Attorney, Agent, or Firm* — Rabin & Berdo, P.C.

(57) ABSTRACT

A drive unit for a straddled vehicle includes an engine main body unit, a transmission unit, and a shared lubrication oil supply mechanism. The shared lubrication oil supply mechanism includes a first booster pump which pressurizes the shared lubrication oil lubricating both the engine main body unit and the transmission unit and a second booster pump which pressurizes at least part of the shared lubrication oil which has been pressurized by the first booster pump and which is in a positive pressure condition.

23 Claims, 15 Drawing Sheets

(51) Int. Cl.
    *B62M 7/02*     (2006.01)
    *F01L 1/24*     (2006.01)
    *F01L 1/344*     (2006.01)
    *F01M 11/02*     (2006.01)
    *F02F 7/00*     (2006.01)
    *F16H 7/08*     (2006.01)
    *F01M 1/12*     (2006.01)
    *F16H 57/02*     (2012.01)

(52) U.S. Cl.
    CPC . *F01M 2001/123* (2013.01); *F01M 2011/021* (2013.01); *F16H 57/02* (2013.01); *F16H 2007/0812* (2013.01); *F16H 2057/0203* (2013.01); *F16H 2057/02065* (2013.01)

(56) References Cited

U.S. PATENT DOCUMENTS

| | | |
|---|---|---|
| 4,703,726 A | 11/1987 | Sekiya et al. |
| 5,918,573 A | 7/1999 | Killion |
| 6,443,263 B1 * | 9/2002 | Ito .......................... F01M 1/12 123/196 R |
| 7,434,561 B2 | 10/2008 | Suzuki et al. |
| 2002/0035978 A1 * | 3/2002 | Usko ....................... F01L 1/24 123/90.55 |
| 2004/0156729 A1 * | 8/2004 | Waterworth ............ F01M 1/02 417/236 |
| 2005/0274344 A1 * | 12/2005 | Auchter ................ F01L 1/3442 123/90.17 |
| 2006/0260873 A1 | 11/2006 | Suzuki et al. |
| 2007/0068479 A1 | 3/2007 | Matsuda |
| 2007/0157900 A1 | 7/2007 | Suzuki et al. |
| 2012/0247418 A1 | 10/2012 | Tanaka et al. |

FOREIGN PATENT DOCUMENTS

| | | |
|---|---|---|
| JP | 2001-241391 A | 9/2001 |
| JP | 2007-182833 A | 7/2007 |
| JP | 2012-117423 A | 6/2012 |
| JP | 2013-170451 A | 9/2013 |
| JP | 2013-204769 A | 10/2013 |

* cited by examiner

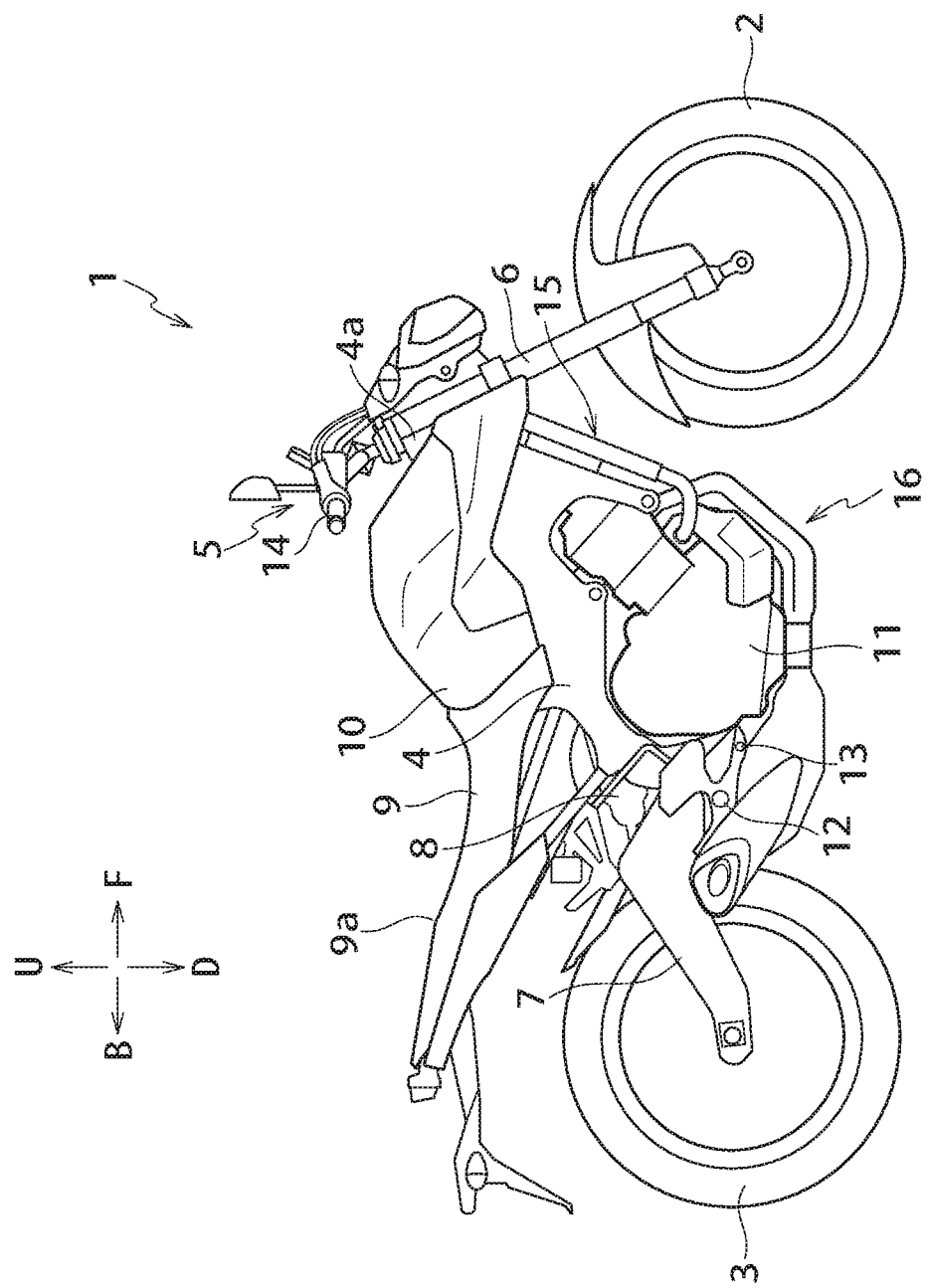
F I G . 2

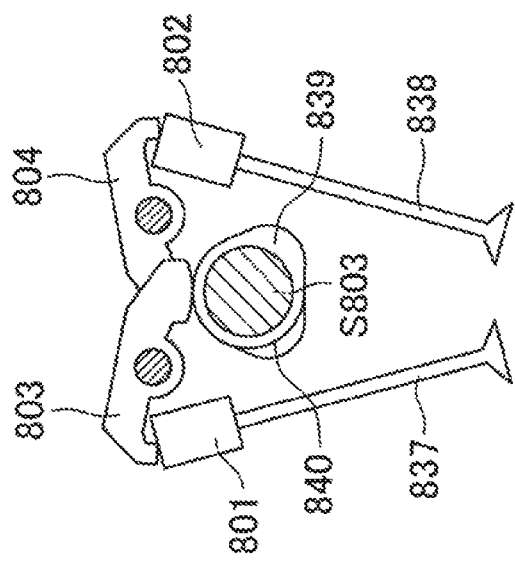
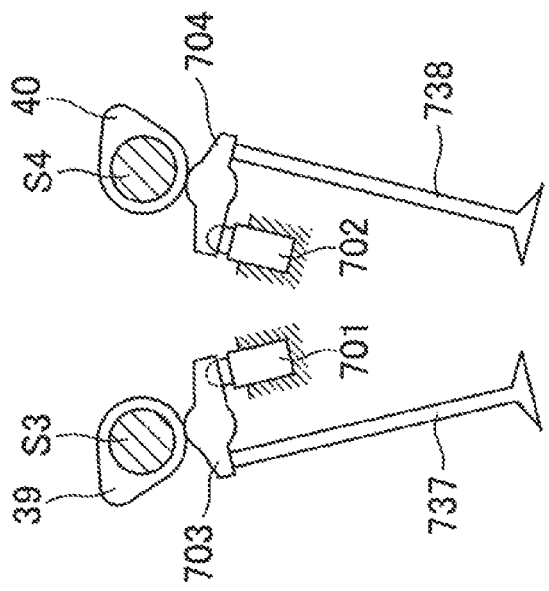
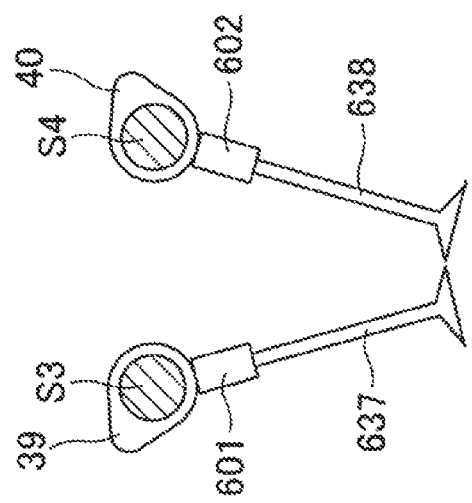

DRIVE UNIT FOR STRADDLED VEHICLE

CROSS-REFERENCE TO RELATED APPLICATIONS

This application is a continuation-in-part of International Application No. PCT/JP2016/080557, filed on Oct. 14, 2016, and claims the benefit of the earlier filing date of PCT/JP2016/080557 and of Japanese Patent Application No. 2015-204557, filed on Oct. 16, 2015. The entire contents of each of the identified applications are incorporated herein by reference.

BACKGROUND

Technical Field

The present teaching relates to a drive unit which is provided for a straddled vehicle and includes an engine main body unit and a transmission unit, and particularly relates to a drive unit which is for a straddled vehicle and is configured to lubricate an engine main body unit and a transmission unit by shared oil.

Background Art

A straddled vehicle including a drive unit in which an engine main body unit and a transmission unit are integrated is already known (see e.g., PTL 1). In the drive unit in which the engine main body unit and the transmission unit are integrated, the engine main body unit and the transmission unit are lubricated by shared oil. Such a drive unit includes a booster pump which is provided for supplying oil by pressure. The booster pump of PTL 1 is driven by a rotational shaft of the drive unit.

CITATION LIST

Patent Literatures

[PTL 1] U.S. Pat. No. 7,434,561

A drive unit in which an engine main body unit and a transmission unit are integrated needs to be downsized. Meanwhile, a booster pump used for a drive unit recently needs to be enhanced in functions, e.g., enhancement of a discharge pressure and a discharge amount. In particular, in a drive unit in which an engine main body unit and a transmission unit are lubricated by shared oil, the number of components which the oil is supplied to is large. It is therefore required to enhance booster pump functions in the drive unit in which the engine main body unit and the transmission unit are lubricated by the shared oil. Assume that the booster pump functions are enhanced in the drive unit in which the engine main body unit and the transmission unit are integrated. This results in an increase in size of the booster pump. On this account, the drive unit is increased in size.

SUMMARY

An object of the present teaching is to restrain increase in size of a drive unit while enhancing booster pump functions, in the drive unit which is provided for a straddled vehicle and includes an engine main body unit and a transmission unit which are lubricated by shared oil.

Solution to Problem and Advantageous Effects of Invention

In regard to a drive unit including an engine main body unit and a transmission unit which are lubricated by shared oil, the inventors of the subject application considered the attempt to restrain increase in size of a drive unit while enhancing booster pump functions, by means of an adjustment of the layout of the booster pump. The inventors therefore reconsidered the layout of the booster pump.

In the drive unit in which the engine main body unit and the transmission unit are lubricated by the shared oil, it is difficult to have a large space inside the drive unit. The engine main body unit and the transmission unit include a plurality of rotational shafts. The inventors of the subject application found that it was easy to have a small space around each of these rotational shafts. Based on this finding, the inventors of the subject application conceived the idea of dividing the booster pump into a plurality of booster pumps each of which was smaller than the booster pump before the division. Then each booster pump was provided in each of the small spaces. Furthermore, the booster pumps are connected in series without the intervention of an oil tank or the like. The inventors noticed that, with this arrangement, the functions of the plurality of booster pumps on the whole were improved while each booster pump was small.

In short, the booster pump was divided into a plurality of booster pumps each of which was smaller than the booster pump before the division, and these booster pumps were connected in series without the intervention of an oil tank or the like. Based on this, the booster pumps were provided by taking advantage of the feature that small spaces were easily secured around the respective rotational shafts of the drive unit. In this way, the increase in size of the drive unit was restrained while the booster pump functions were enhanced.

[1] The present teaching relates to a drive unit for a straddled vehicle which includes a vehicle body frame, a seat supported by the vehicle body frame, and the drive unit provided below an upper end of an upper surface of the seat in a vehicle up-down direction and supported by the vehicle body frame. The drive unit includes: an engine main body unit including a crankshaft; a transmission unit including an input shaft rotationally driven by the crankshaft and an output shaft rotationally driven by the input shaft; and a shared lubrication oil supply mechanism including a first booster pump configured to pressurize shared lubrication oil by which both the engine main body unit and the transmission unit are lubricated and a second booster pump configured to pressurize at least a part of the shared lubrication oil which has been pressurized by the first booster pump and is in a positive pressure condition, the shared lubrication oil supply mechanism supplying high-pressure shared lubrication oil, which is obtained by pressurizing, by the second booster pump, at least part of the shared lubrication oil which has been pressurized by the first booster pump and is in the positive pressure condition, to at least one of the engine main body unit or the transmission unit.

According to these arrangements, the drive unit is provided below the upper end of the upper surface of the seat and is supported by the vehicle body frame. The drive unit includes the engine main body unit, the transmission unit, and the shared lubrication oil supply mechanism. The engine main body unit includes the crankshaft. The transmission unit includes the input shaft rotationally driven by the crankshaft and the output shaft rotationally driven by the input shaft. The engine main body unit and the transmission unit are lubricated by the shared lubrication oil. The shared lubrication oil supply mechanism includes the first booster pump and the second booster pump. The first booster pump is configured to pressurize the shared lubrication oil. The second booster pump further pressurizes at least part of the shared lubrication oil which has been pressurized by the first booster pump and is in the positive pressure condition. High-pressure shared lubrication oil which is obtained in such a way that at least part of the shared lubrication oil which has been pressurized by the first booster pump and is in the positive pressure condition is further pressurized by the second booster pump is supplied to at least one of the engine main body unit and the transmission unit. In this specification, "at least one of a plurality of options" encompasses any possible combinations of the options. "At least one of a plurality of options" may be one of the options, or all of the options. In this way, the shared lubrication oil is pressurized by using two booster pumps. On this account, each booster pump is downsized whereas the booster pump functions are enhanced, as compared to cases where only one booster pump is used. It is noted that the "booster pump functions" are not functions of each of the first booster pump and the second booster pump. The "booster pump functions" are functions obtained by both the first booster pump and the second booster pump.

The engine main body unit and the transmission unit include the plurality of rotational shafts. In the drive unit which lubricates both the engine main body unit and the transmission unit by the shared lubrication oil, it is easy to secure a small space around each of these rotational shafts. Because each booster pump is downsized, it is possible to provide each booster pump in such a small space. The total number of rotational shafts of the engine main body unit and the transmission unit is three or more. On this account, the number of spaces around the respective rotational shafts is three or more, too. Therefore, the degree of freedom in the layout of the downsized booster pumps is high. It is therefore possible to prevent the increase in size of the drive unit even though two booster pumps are provided in the drive unit.

In this way, in the drive unit in which the engine main body unit and the transmission unit are lubricated by shared oil, the increase in size of the drive unit can be restrained while the booster pump functions are enhanced.

[2] According to another aspect of the invention, the drive unit of the present teaching preferably has the following arrangements.

The engine main body unit includes a crankcase member which houses at least a part of the crankshaft.

The transmission unit includes a transmission case member which houses at least a part of the input shaft and at least a part of the output shaft and is at least partially integrally molded with at least a part of the crankcase member.

The drive unit includes a drive unit case which includes the crankcase member and the transmission case member and houses the first booster pump and the second booster pump.

According to these arrangements, the drive unit case includes the crankcase member and the transmission case member. The drive unit case houses the first booster pump and the second booster pump. At least a part of the crankcase member and at least a part of the transmission case member are integrally molded. In other words, the engine main body unit is integrated with the transmission unit. The drive unit in which the engine main body unit is integrated with the transmission unit is required to be downsized. According to the present teaching, with regard to the drive unit which is required to be downsized, increase in size of the drive unit can be restrained while the booster pump functions are enhanced.

[3] According to another aspect of the invention, the drive unit of the present teaching preferably has the following arrangement, in addition to the arrangements in [2] above.

At least a part of a high-pressure oil passage member is formed in the drive unit case, wherein the high-pressure shared lubrication oil obtained by pressurizing, by the second booster pump, at least part of the shared lubrication oil having been pressurized by the first booster pump and being in the positive pressure condition flows in the high-pressure oil passage member.

According to this arrangement, at least a part of the high-pressure oil passage member is formed in the drive unit case. The high-pressure shared lubrication oil obtained by pressurizing, by the second booster pump, at least part of the shared lubrication oil which has been pressurized by the first booster pump and is in a positive pressure condition flows in the high-pressure oil passage member.

The drive unit can therefore be downsized as compared to cases where no high-pressure oil passage member is formed in the drive unit case.

[4] According to another aspect of the invention, the drive unit of the present teaching preferably has the following arrangement.

The shared lubrication oil supply mechanism supplies, to at least one of the engine main body unit or the transmission unit, the high-pressure shared lubrication oil which is obtained by pressurizing at least part of the shared lubrication oil which has been pressurized by the first booster pump and is in the positive pressure condition without further pressurizing that part of the shared lubrication oil by the second booster pump.

According to this arrangement, part of the shared lubrication oil which has been pressurized by the first booster pump and is in the positive pressure condition is supplied to at least one of the engine main body unit or the transmission unit, without being further pressurized by the second booster pump. The remaining part of the shared lubrication oil which has been pressurized by the first booster pump and is in the positive pressure condition is supplied to at least one of the engine main body unit or the transmission unit, after being further pressurized by the second booster pump. This makes it possible to supply, to each supply target, shared lubrication oil with a pressure suitable for each supply target. It is therefore unnecessary to wastefully pressurize the shared lubrication oil. On this account, each of the booster pumps can be downsized as compared to cases where the shared lubrication oil pressurized by two booster pumps is supplied to all supply targets. As a result, the increase in size of the drive unit can be further restrained while the booster pump functions are enhanced.

[5] According to another aspect of the invention, the drive unit of the present teaching preferably has the following arrangement.

The drive unit further includes a low-pressure communication passage which causes a first discharge pump chamber formed in the first booster pump and discharging the shared lubrication oil pressurized by the first booster pump to communicate with a second suction pump chamber formed in the second booster pump and sucking at least part of the shared lubrication oil having been pressurized by the first booster pump and being in the positive pressure condition, the low-pressure communication passage maintaining pressure of the shared lubrication oil having been pressurized by the first booster pump and being in the positive pressure condition to be a positive pressure.

According to this arrangement, the low-pressure communication passage which allows the first discharge pump chamber of the first booster pump to communicate with the second suction pump chamber of the second booster pump maintains the pressure of the shared lubrication oil, which has been pressurized by the first booster pump and is in the positive pressure condition, to be a positive pressure. On this account, the high-pressure shared lubrication oil obtained due to the pressurization by the second booster pump is certainly higher than the pressure of the shared lubrication oil having been pressurized by the first booster pump. As a result, the increase in size of the drive unit can be further restrained while the booster pump functions are further enhanced.

[6] According to another aspect of the invention, the drive unit of the present teaching preferably has the following arrangement.

At least one of the first booster pump or the second booster pump is driven by rotational force of at least one of rotational shafts of the engine main body unit and the transmission unit.

According to this arrangement, at least one of the first booster pump or the second booster pump is driven by the rotational force of at least one of the rotational shafts of the engine main body unit and the transmission unit. On this account, the spaces around the rotational shafts are further effectively utilized as compared to cases where two booster pumps are both electrically driven, and at least one of the booster pumps can be provided in the spaces. As a result, the increase in size of the drive unit can be further restrained while the booster pump functions are enhanced.

[7] According to another aspect of the invention, the drive unit of the present teaching preferably has the following arrangement.

At least one of the engine main body unit or the transmission unit includes at least one hydraulically-actuated device which is operated by the high-pressure shared lubrication oil obtained by pressurizing, by the second booster pump, at least part of the shared lubrication oil having been pressurized by the first booster pump and being in the positive pressure condition.

According to this arrangement, the high-pressure shared lubrication oil obtained by pressurizing, by the second booster pump, at least part of the shared lubrication oil which has been pressurized by the first booster pump and is in a positive pressure condition is supplied to the at least one hydraulically-actuated device. On this account, a high hydraulic pressure can be obtained without increasing the size of the booster pump, even if a high hydraulic pressure is required to drive the hydraulically-actuated device.

[8] According to another aspect of the invention, the drive unit of the present teaching preferably has the following arrangements, in addition to the arrangement in [7] above.

The engine main body unit includes at least one combustion chamber, a plurality of gas passages connected to the at least one combustion chamber, and a plurality of valves provided on the respective gas passages.

The hydraulically-actuated device which is operated by the high-pressure shared lubrication oil obtained by pressurizing, by the second booster pump, at least part of the shared lubrication oil having been pressurized by the first booster pump and being in the positive pressure condition is a variable valve timing device configured to change timings to open and close the valves.

The variable valve timing device does not require a large amount of operating oil. However, a particularly high hydraulic pressure is required to obtain a sufficient operation speed. For this reason, the booster pump is significantly large in size in the known arrangement in which only one booster pump is used. According to the present teaching, the high-pressure shared lubrication oil obtained by pressurizing, by the second booster pump, at least part of the shared lubrication oil which has been pressurized by the first booster pump and is in a positive pressure condition is supplied to the variable valve timing device. As a result, the increase in size of the drive unit can be further restrained while the booster pump functions are enhanced.

[9] According to another aspect of the invention, the drive unit of the present teaching preferably has the following arrangements, in addition to the arrangement in [7] above.

The engine main body unit includes a cam shaft, a cam rotational body provided on the cam shaft, a crank rotational body provided on the crankshaft, and a winding member wound onto the cam rotational body and the crank rotational body.

The hydraulically-actuated device which is operated by the high-pressure shared lubrication oil obtained by pressurizing, by the second booster pump, at least part of the shared lubrication oil having been pressurized by the first booster pump and being in the positive pressure condition is a tensioner device configured to impart tension to the winding member.

According to this arrangement, the high-pressure shared lubrication oil obtained by pressurizing, by the second booster pump, at least part of the shared lubrication oil which has been pressurized by the first booster pump and is in a positive pressure condition is supplied to the tensioner device. It is therefore possible to supply high-pressure shared lubrication oil to the tensioner device.

[10] According to another aspect of the invention, the drive unit of the present teaching preferably has the following arrangements, in addition to the arrangement in [7] above.

The engine main body unit includes at least one combustion chamber, a plurality of gas passages connected to the at least one combustion chamber, a plurality of valves provided on the respective gas passages, and a pressing member pressing at least one of the valves in an opening direction.

The at least one hydraulically-actuated device which is operated by the shared lubrication oil obtained by pressurizing, by the second booster pump, at least part of the shared lubrication oil having been pressurized by the first booster pump and is in the positive pressure condition is a lash adjuster which is provided between the valve and the pressing member and is always in contact with the valve and the pressing member.

According to these arrangements, the lash adjuster which is provided between the valves and the pressing member and is always in contact with the valves and the pressing member is provided. The high-pressure shared lubrication oil obtained by pressurizing, by the second booster pump, at least part of the shared lubrication oil which has been pressurized by the first booster pump and is in the positive pressure condition is supplied to this lash adjuster. It is therefore possible to supply high-pressure shared lubrication oil to the lash adjuster.

[11] According to another aspect of the invention, the drive unit of the present teaching preferably has the following arrangements, in addition to the arrangement in [7] above.

The engine main body unit includes at least one combustion chamber, a plurality of gas passages connected to the at least one combustion chamber, a plurality of valves provided on the respective gas passages, and a pressing member pressing at least one of the valves in an opening direction.

The at least one hydraulically-actuated device which is operated by the high-pressure shared lubrication oil obtained by pressurizing, by the second booster pump, at least part of the shared lubrication oil having been pressurized by the first booster pump and being in the positive pressure condition is a lash adjuster which presses the pressing member in the opening direction so as to cause the valves to always be in contact with the pressing member.

According to these arrangements, the lash adjuster which presses the pressing member in the valve opening direction so as to cause the valves to always be in contact with the pressing member is provided. The high-pressure shared lubrication oil obtained by pressurizing, by the second booster pump, at least part of the shared lubrication oil which has been pressurized by the first booster pump and is in the positive pressure condition is supplied to this lash adjuster. It is therefore possible to supply high-pressure shared lubrication oil to the lash adjuster.

[12] According to another aspect of the invention, the drive unit of the present teaching preferably has the following arrangements, in addition to the arrangement in [6] above.

The first booster pump and the second booster pump are both driven by a rotational force of the one of the rotational shafts of the engine main body unit and the transmission unit.

According to this arrangement, the first booster pump and the second booster pump are driven by the rotational force of the same rotational shaft. The first booster pump and the second booster pump are therefore easily provided on the same shaft. When two booster pumps are provided on the same shaft, it is easy to arrange the two booster pumps to share a part of the housing. When two booster pumps share a part of the housing, it is possible to further downsize the two booster pumps. As a result, the increase in size of the drive unit can be further restrained while the booster pump functions are enhanced.

[13] According to another aspect of the invention, the drive unit of the present teaching preferably has the following arrangements, in addition to the arrangement in [12] above.

The first booster pump and the second booster pump are provided side by side on a single shaft.

The first booster pump includes a first booster pump main body and a first housing which houses the first booster pump main body.

The second booster pump includes a second booster pump main body and a second housing which houses the second booster pump main body.

At least a part of the first housing is also at least a part of the second housing.

According to these arrangements, the first booster pump and the second booster pump are provided side by side on the same shaft. Furthermore, at least a part of the housing of the first booster pump is also at least a part of the housing of the second booster pump. The two booster pumps can therefore be further downsized. As a result, the increase in size of the drive unit can be further restrained while the booster pump functions are enhanced.

[14] According to another aspect of the invention, the drive unit of the present teaching preferably has the following arrangement, in addition to the arrangement in [6] above.

The first booster pump and the second booster pump are driven by rotational forces of mutually different rotational shafts among the rotational shafts of the engine main body unit and the transmission unit, respectively.

According to this arrangement, the first booster pump and the second booster pump are driven by mutually different rotational shafts. It is therefore possible to provide the first booster pump and the second booster pump to be remote from each other. The degree of freedom in the layout of the booster pumps can be increased. As a result, the increase in size of the drive unit can be further restrained while the booster pump functions are enhanced.

[15] According to another aspect of the invention, the drive unit of the present teaching preferably has the following arrangements.

The engine main body unit includes a cam shaft and a balance shaft which are rotationally driven by the crankshaft, and At least one of the first booster pump or the second booster pump is driven by rotational force of the cam shaft or the balance shaft.

According to these arrangements, at least one of the first booster pump or the second booster pump is driven by rotational force of the cam shaft or the balance shaft. The input shaft and the output shaft of the transmission unit do not always rotate when the crankshaft rotates. Meanwhile, the cam shaft and the balance shaft are driven by the crankshaft whenever the crankshaft rotates. Because the discharge pressure of the shared lubrication oil can be stably secured, the booster pump functions are enhanced.

Furthermore, a space where a booster pump is provided is easily found around the cam shaft and the balance shaft, as compared to the vicinity of the crankshaft. As a result, the increase in size of the drive unit can be further restrained while the booster pump functions are enhanced.

[16] According to another aspect of the invention, the drive unit of the present teaching preferably has the following arrangements.

The engine main body unit includes a drive gear which is provided on the crankshaft and rotates together with the crankshaft.

The transmission unit includes a driven gear which is provided on the input shaft to be relatively rotatable and is engaged with the drive gear.

At least one of the first booster pump or the second booster pump is preferably driven by rotational force of the driven gear.

According to these arrangements, at least one of the first booster pump or the second booster pump is driven by rotational force of the driven gear which is provided on the input shaft to be relatively rotatable. The driven gear always rotates when the crankshaft rotates because this gear is engaged with the drive gear which rotates together with the crankshaft. Because the discharge pressure of the booster pump can be stably secured, the booster pump functions are enhanced.

Furthermore, a space where a booster pump is provided is easily found around the driven gear on the input shaft, as compared to the vicinity of the crankshaft. As a result, the increase in size of the drive unit can be further restrained while the booster pump functions are enhanced.

In the present teaching, the high-pressure shared lubrication oil may be supplied to the engine main body unit. The high-pressure shared lubrication oil may be supplied to the transmission unit. The high-pressure shared lubrication oil may be supplied to both the engine main body unit and the transmission unit. The high-pressure shared lubrication oil is obtained by pressurizing, by the second booster pump, at least part of the shared lubrication oil which has been pressurized by the first booster pump and is in a positive pressure condition.

According to the present teaching, part of the shared lubrication oil which has been pressurized by the first booster pump and is in the positive pressure condition may be supplied to the engine main body unit without being further pressurized by the second booster pump. Part of the shared lubrication oil which has been pressurized by the first booster pump and is in the positive pressure condition may be supplied to the transmission unit without being further pressurized by the second booster pump. Part of the shared lubrication oil which has been pressurized by the first booster pump and is in the positive pressure condition may be supplied to both the engine main body unit and the transmission unit without being further pressurized by the second booster pump.

In this specification, "a plurality of booster pumps are connected in series without the intervention of an oil tank or the like" indicates that at least part of shared lubrication oil which has been pressurized by the first booster pump and is in a positive pressure condition is further pressurized by the second booster pump. The oil tank is a member which serves a function of allowing the shared lubrication oil to be at atmospheric pressure as well as a function of storing the shared lubrication oil. The oil tank described above does not serve a function of maintaining the pressure of the shared lubrication oil to be a positive pressure and storing the shared lubrication oil. A member having such a function is an accumulator. In the present teaching, an accumulator may be provided on a hydraulic path between the first booster pump and the second booster pump. In the present teaching, the positive pressure is a pressure higher than atmospheric pressure.

In the present teaching, a first discharge pump chamber formed in the first booster pump and discharging the shared lubrication oil pressurized by the first booster pump and being in the positive pressure condition may directly communicate with a second suction pump chamber formed in the second booster pump and sucking at least part of the shared lubrication oil having been pressurized by the first booster pump and being in the positive pressure condition. In this case, it is unnecessary to provide the low-pressure communication passage which allows the first discharge pump chamber to communicate with the second suction pump chamber and maintains the pressure of the shared lubrication oil, which has been pressurized by the first booster pump and is in the positive pressure condition, to be a positive pressure.

In the present teaching, the number of the hydraulically-actuated devices each operated by the high-pressure shared lubrication oil obtained by pressurizing, by the second booster pump, at least part of the shared lubrication oil having been pressurized by the first booster pump and being in the positive pressure condition may be one or more.

In the present teaching, the first housing of the first booster pump and the second housing of the second booster pump may be separate members. The first housing of the first booster pump may or may not include a part of the drive unit case. The second housing of the second booster pump may or may not include a part of the drive unit case.

In the present teaching, the first booster pump and the second booster pump may be arranged as described below. The first booster pump may be a rotary pump. The second booster pump may be a rotary pump. The first booster pump may be a plunger pump. The second booster pump may be a plunger pump. The first booster pump may be a mechanical pump driven by the drive unit. The second booster pump may be a mechanical pump driven by the drive unit. The first booster pump may be an electric pump driven by an electric actuator such as a motor and a solenoid. The second booster pump may be an electric pump driven by an electric actuator such as a motor and a solenoid. At least one of the first booster pump or the second booster pump may be an electric pump. The first booster pump and the second booster pump may be a combination of an electric pump and a mechanical pump. A plurality of first booster pumps may be provided in a parallel manner. A plurality of second booster pumps may be provided in a parallel manner. A third booster pump which is able to pressurize the shared lubrication oil independently from the first booster pump and the second booster pump may be provided. A fourth booster pump which pressurizes the shared lubrication oil having been pressurized by both the first booster pump and the second booster pump may be provided.

In the present teaching, the driving of a booster pump by rotational force of a first rotational shaft may be achieved by one of the following arrangements. A booster pump may be provided on the first rotational shaft. Alternatively, a drive gear provided on the first rotational shaft may be engaged with a driven gear provided on a second rotational shaft on which a booster pump is provided. Alternatively, a belt may be wound on a drive pulley on the first rotational shaft and a driven pulley on a second rotational shaft on which a booster pump is provided. Alternatively, a chain may be wound on a drive sprocket on the first rotational shaft and a driven sprocket on a second rotational shaft on which a booster pump is provided. In short, the rotational force of the first rotational shaft may be transmitted to the booster pump via the belt or the chain.

When both the first booster pump and the second booster pump are driven by the rotational force of one of the rotational shafts of the engine main body unit and the transmission unit, the first booster pump and the second booster pump may not be provided on the same shaft.

The engine main body unit of the present teaching is not limited to any particular arrangement on condition that the engine main body unit includes a crankshaft. The engine main body unit may be a 2-stroke engine. The engine main body unit is preferably a 4-stroke engine. The engine main body unit may be a single-cylinder engine. The engine main body unit is preferably a multi-cylinder engine. The number of cylinders is not particularly limited. The engine main body unit may be a forced induction engine with a forced-induction compressor. In such a case, high-pressure shared lubrication oil obtained by pressurizing, by the second booster pump, at least part of the shared lubrication oil which has been pressurized by the first booster pump and is in a positive pressure condition may be supplied to the forced-induction compressor. Alternatively, part of the shared lubrication oil having been pressurized by the first booster pump and being in the positive pressure condition may be supplied to the forced-induction compressor without being further pressurized by the second booster pump. The forced-induction compressor may be a supercharger or a turbocharger. The engine main body may be a natural air-cooled engine or a forced air-cooled engine. The engine main body may be a water-cooled engine.

The transmission unit of the present teaching may be a transmission configured to transmit power by gears. The transmission unit may be a continuously variable transmission (CVT) adopting a metal belt or a chain.

When the transmission unit is a transmission configured to transmit power by gears, the transmission may adopt a manual transmission. The transmission unit may adopt a full automatic transmission. The transmission unit may adopt a semi-automatic transmission. In the manual transmission, gear shifting is performed when the rider operates a clutch lever and a shift pedal. In the full automatic transmission, gear shifting is performed when a shift actuator is automatically driven in accordance with the vehicle speed, the engine rotation speed, or the like. In the semi-automatic transmission, only the clutch operation is automatically done, and gear shifting is performed when the rider operates a shift pedal.

In the present teaching, the rotational axis of the input shaft of the transmission unit may be in parallel to the rotational axis of the crankshaft of the engine main body unit. The rotational axis of the input shaft of the transmission unit may not be in parallel to the rotational axis of the crankshaft of the engine main body unit. In the present teaching, the rotational axis of the output shaft of the transmission may be in parallel to the rotational axis of the crankshaft of the engine main body unit. The rotational axis of the output shaft of the transmission may not be in parallel to the rotational axis of the crankshaft of the engine main body unit. When the first booster pump is a rotary pump, its rotational axis may be in parallel to or coaxial with one of the rotational axis of the input shaft of the transmission unit, the rotational axis of the output shaft, and the rotational axis of the crankshaft of the engine main body unit. When the second booster pump is a rotary pump, its rotational axis may be in parallel to or coaxial with one of the rotational axis of the input shaft of the transmission unit, the rotational axis of the output shaft, and the rotational axis of the crankshaft of the engine main body unit.

In the present teaching, at least a part of the input shaft of the transmission unit preferably overlaps at least a part of the crankshaft when viewed in the direction orthogonal to the rotational axis of the input shaft. In other words, a part of the crankshaft is preferably between two planes which are orthogonal to the rotational axis of the input shaft and pass the input shaft. At least a part of the output shaft of the transmission unit preferably overlaps at least a part of the crankshaft when viewed in the direction orthogonal to the rotational axis of the output shaft. In other words, a part of the crankshaft is preferably between two planes which are orthogonal to the rotational axis of the output shaft and pass the output shaft. In the present teaching, the rotational shafts of the engine main body unit and the transmission unit may be arranged as described below. A part of one of the rotational shafts may be between two planes which are orthogonal to the rotational axis of another rotational shaft and pass said another rotational shaft.

The vehicle body frame of the present teaching is a member which predominantly receives stress in the vehicle. The vehicle body frame may be a frame formed by combining a plurality of members or an integrally molded frame. The vehicle body frame may be made of metal such as aluminum and iron, resin such as CFRP, or a combination of them. The vehicle body frame may have a monocoque structure and be formed of appearance components of the vehicle or a semi-monocoque structure in which a part of the structure functions as an appearance component of the vehicle.

In the present teaching, the drive unit case rotatably supports the crankshaft, the input shaft, and the output shaft. The drive unit case may be composed of a plurality of members. The drive unit case may include an upper case and a lower case which is provided straight below the upper case in the vehicle up-down direction. The drive unit case may include a left case and a right case which is provided to the right of the left case in the vehicle left-right direction. The drive unit case may not include a combustion chamber therein.

In the present teaching, the seat is a part on which the rider is seated, and does not include a part on which the waist or back of the rider leans. The seat does not include a part on which a tandem rider (passenger) is seated.

In the present teaching, the straddled vehicle indicates all types of vehicles on which a rider rides in a manner of straddling on a saddle. The straddled vehicle includes motorcycles, tricycles, four-wheeled buggies (ATVs: All Terrain Vehicles), personal water crafts, snowmobiles, and the like. When the straddled vehicle is a motorcycle, such a motorcycle includes a scooter, an engine-equipped bicycle, a moped, etc.

The passage member in the present teaching indicates members such as wall members which encompass a passage to form the passage. The passage indicates a space where an object passes.

In this specification, the direction along an A direction is not limited to the direction in parallel to the A direction. The direction along the A direction includes cases where a direction intersects with the A direction at an angle which falls within the range from −45 degrees to 45 degrees. In this specification, a linear line along the A direction is not limited to the linear line in parallel to the A direction. The linear line along the A direction includes cases where a linear line intersects with the A direction at an angle which falls within the range from −45 degrees to 45 degrees. The direction A does not indicate any specific direction. The direction A may be the horizontal direction or the front-rear direction.

In this specification, the wording "members A and B are lined up in an X direction" indicates the following state. When members A and B are viewed in a direction orthogonal to the X direction, members A and B are both provided on a linear line which is parallel to the X direction.

In this specification, the wording "members A and B are lined up in an X direction when viewed in a Y direction" indicates the following state. When members A and B are viewed in the Y direction, members A and B are both provided on a linear line which is parallel to the X direction. In this regard, when members A and B are viewed in a W direction which is different from the Y direction, at least one of member A or member B may not be provided on the linear line which is parallel to the X direction.

In these two definitions, members A and B may be in contact with each other. Members A and B may not be in contact with each other. A member C may be provided between members A and B.

In this specification, the wording "a member A is provided forward of a member B" indicates the following state. Member A is provided in front of a plane which passes the front-most end of member B and is orthogonal to the front-rear direction. In this connection, members A and B may or may not be lined up in a direction along the front-rear direction. This applies to the directions other than the front-rear direction. (That is to say, this applies to the directions other than "forward of", such as "rearward of", "below", "leftward of", and "rightward of".)

In this specification, the wording "a member A is provided in front of a member B" indicates the following state. Members A and B are lined up in the front-rear direction and a part of member A, the part facing member B, is provided in front of member B. According to this definition, when a part of the front surface of member B, the part facing member A, is the front-most end of member B, member A is provided forward of member B. According to the definition, when a part of the front surface of member B, the part facing member A, is not the front-most end of member B, member A may or may not be provided forward of member B. This applies to the directions other than the front-rear direction. (That is to say, this applies to the directions other than "in front of", such as "behind", "straight below", "to the left of", and "to the right of".) The front surface of member B is a surface which is viewable when member B is viewed from the front side. Depending on the shape of member B, the front surface of member B may be formed of plural surfaces, instead of a single continuous surface.

In the present teaching, terms "including", "comprising", "having", and derivatives thereof are used to encompass not only listed items and equivalents thereof but also additional items. In the present teaching, the terms "mounted", "connected", "coupled", and "supported" are used in a broad sense. To be more specific, the terms encompass not only directly mounting, connection, coupling, and supporting but also indirectly mounting, connection, coupling, and supporting. Furthermore, the terms "connected" and "coupled" do not merely indicate physical or mechanical connection and coupling. These terms encompass direct or indirect electric connection and coupling.

In this specification, the term "preferable" is non-exclusive. The term "preferable" means "preferable but not limited to". In this specification, an arrangement which is "preferable" exerts at least the above-described effects of the arrangement [1] described above. In this specification, the term "may" is non-exclusive. The term "may" indicate "may but not must". In this specification, an arrangement which is explained by using the term "may" exerts at least the above-described effects of the arrangement [1] described above.

In the present teaching, the arrangements of the different aspects described above may be variously combined. Before an embodiment of the present teaching is detailed, it is to be noted that the present teaching is not limited to the configurations and layout of elements described below and/or shown in drawings. The present teaching may be implemented as an embodiment other than the below-described embodiment. The present teaching may be implemented as an embodiment other than the below-described embodiment. Furthermore, the present teaching may be implemented by suitably combining below-described modifications.

BRIEF DESCRIPTION OF THE DRAWINGS

FIG. 2 is a right side view of a motorcycle of Specific Example 1 of the embodiment.

FIG. 15A shows a valve operating mechanism of the drive unit of another modification.

FIG. 15B shows a valve operating mechanism of the drive unit of another modification.

FIG. 15C shows a valve operating mechanism of the drive unit of another modification.

DETAILED DESCRIPTION

Embodiment of the Present Teaching

Figure 1:
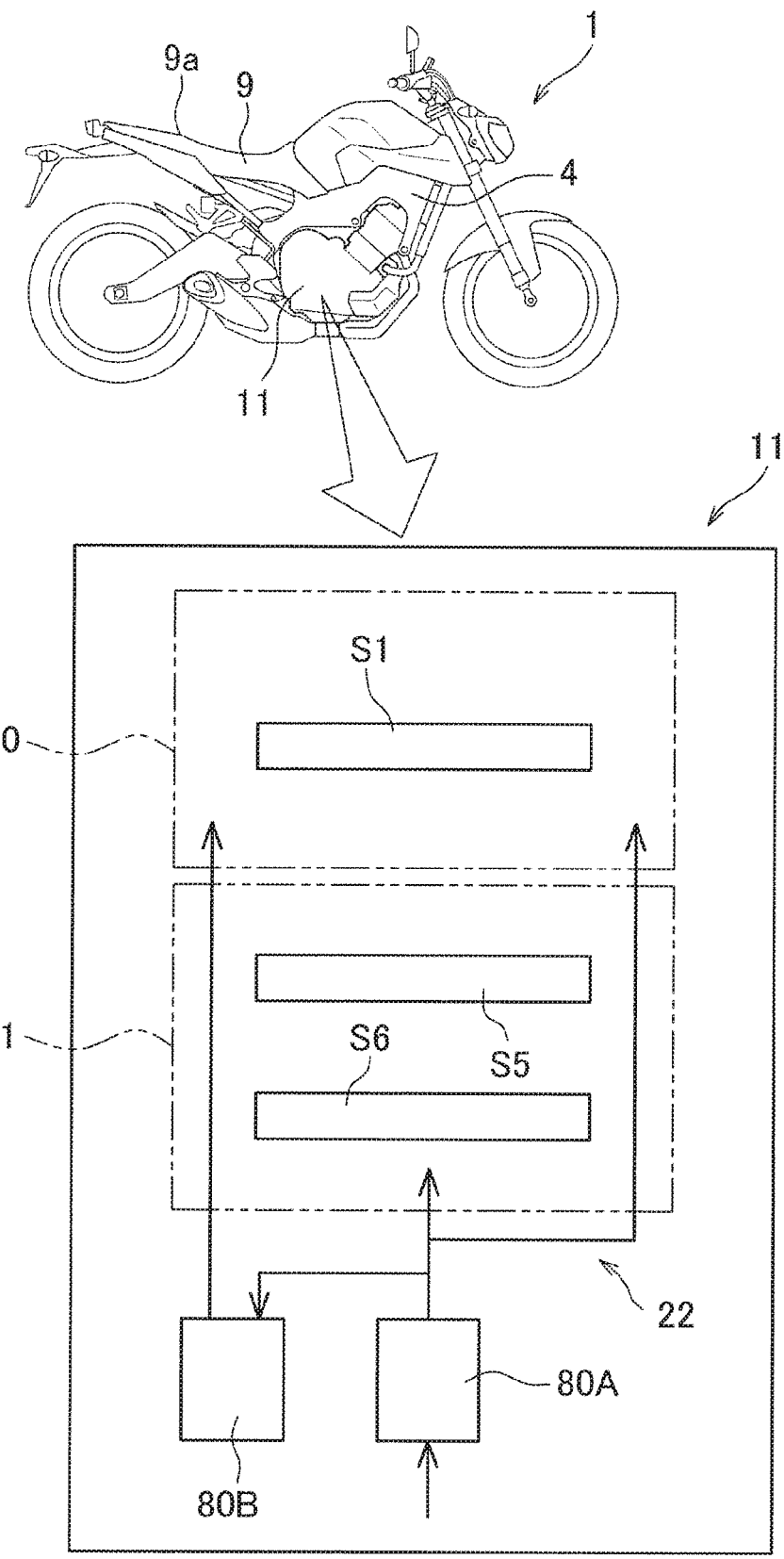
FIG. 1 shows an outline of a drive unit for a straddled vehicle of an embodiment.

The following will describe an embodiment of the present teaching with reference to FIG. 1. The present embodiment is an example of applying the present teaching to a motorcycle. The motorcycle 1 includes a vehicle body frame 4, a seat 9, and a drive unit 11. The vehicle body frame 4 supports the seat 9 and the drive unit 11. The drive unit 11 is provided below an upper end 9a of the upper surface of the seat 9 in the up-down direction of the vehicle. The drive unit 11 includes an engine main body unit 20, a transmission unit 21, and a shared lubrication oil supply mechanism 22. The engine main body unit 20 includes a crankshaft S1. The transmission unit 21 includes an input shaft S5 rotationally driven by the crankshaft S1 and an output shaft S6 rotationally driven by the input shaft S5. The engine main body unit 20 and the transmission unit 21 are lubricated by the shared lubrication oil. The shared lubrication oil supply mechanism 22 includes a first booster pump 80A and a second booster pump 80B. The first booster pump 80A is configured to pressurize the shared lubrication oil. The second booster pump 80B further pressurizes at least part of the shared lubrication oil which has been pressurized by the first booster pump 80A and is in a positive pressure condition. The shared lubrication oil supply mechanism 22 supplies, to at least one of the engine main body unit 20 or the transmission unit 21, high-pressure shared lubrication oil which is obtained in such a way that at least part of the shared lubrication oil which has been pressurized by the first booster pump 80A and is in the positive pressure condition is further pressurized by the second booster pump 80B. In this way, the shared lubrication oil is pressurized by using two booster pumps 80A and 80B. On this account, each booster pump is downsized whereas the booster pump functions are enhanced, as compared to cases where only one booster pump is used. It is noted that the "booster pump functions" are not functions of each of the first booster pump 80A and the second booster pump 80B but functions achieved by the combination of the first booster pump 80A and the second booster pump 80B.

The engine main body unit 20 and the transmission unit 21 include rotational axes including the rotational axes S1, S5, and S6. In the drive unit 11 which lubricates both the engine main body unit 20 and the transmission unit 21 by the shared lubrication oil, it is easy to secure a small space around each of these rotational shafts. Because each of the booster pumps 80A and 80B is downsized, it is possible to provide each of the booster pumps 80A and 80B in such a small space. Because the number of rotational axes of the drive unit 11 is three or more, the number of spaces around the respective rotational shafts is three or more, too. On this account, the degree of freedom in the layout of the downsized booster pumps 80A and 80B is high. It is therefore possible to prevent the increase in size of the drive unit 11 even though two booster pumps 80A and 80B are provided in the drive unit 11.

In this way, in the drive unit 11 in which the engine main body unit 20 and the transmission unit 21 are lubricated by shared oil, the increase in size of the drive unit 11 can be restrained while the booster pump functions are enhanced.

Specific Example 1 of Embodiment of Present Teaching

Specific Example 1 of the above-described embodiment of the present teaching will be described with reference to FIG. 2 to FIG. 7. In the descriptions below, members identical with those in the above-described embodiment of the present teaching are not explained again. Basically, specific examples of an embodiment of the present teaching fully encompass the embodiment of the present teaching. Hereinafter, a front-rear direction indicates a vehicle front-rear direction for the rider seated on the later-described seat 9 of the motorcycle 1. A left-right direction indicates a vehicle left-right direction (vehicle width direction) for the rider seated on the later-described seat 9. An up-down direction indicates an up-down direction of the motorcycle 1. To be more specific, this up-down direction is an up-down direction when the motorcycle 1 vertically stands up on a horizontal road surface. In each figure, arrows F, B, U, D, L, and R indicate forward, rearward, upward, downward, leftward, and rightward, respectively.

[Overall Structure of Motorcycle]

As shown in FIG. 2, the motorcycle 1 includes a front wheel 2, a rear wheel 3, and a vehicle body frame 4. The vehicle body frame 4 includes a head pipe 4a at a front portion. A steering shaft (not illustrated) is rotatably inserted into the head pipe 4a. An upper end portion of the steering shaft is fixed to a handle unit 5. The steering shaft is connected to paired front forks 6. The lower end portions of the front forks 6 support the front wheel 2.

The vehicle body frame 4 swingably supports a pair of swingarms 7. A rear end portion of each swingarm 7 supports the rear wheel 3. Each swingarm 7 is connected, at a portion rearward of the swing center, to the vehicle body frame 4 via a rear suspension 8.

The vehicle body frame 4 supports the seat 9 and a fuel tank 10. The fuel tank 10 is provided in front of the seat 9. Furthermore, the vehicle body frame 4 supports a drive unit 11. The drive unit 11 is provided below the upper end 9a of the upper surface of the seat 9. The seat 9 is a part on which the rider (driver) is seated, and does not include a part on which a tandem rider (passenger) is seated. The vehicle body frame 4 supports a battery (not illustrated) which is configured to supply electric power to electronic apparatuses such as sensors and a controller. The controller controls operations of components of the motorcycle 1.

Footrests 12 are provided at left and right parts of a lower part of the motorcycle 1, respectively. A brake pedal 13 is provided in front of the right footrest 12. As the rider operates the brake pedal 13, a braking force is applied to the rotation of the rear wheel 3. A shift pedal which is not illustrated is provided in front of the left footrest 12. This shift pedal is operated when the transmission ratio of a later-described transmission unit 21 is changed. Alternatively, a shift switch may be provided on the handle unit 5 in place of the shift pedal.

The handle unit 5 includes an accelerator grip 14, a brake lever (not illustrated), and a clutch lever (not illustrated). The accelerator grip 14 is operated to adjust the output of the engine. The brake lever is operated to apply a braking force to the rotation of the front wheel 2. The clutch lever is operated when power transmission is cut off by a later-described clutch mechanism 70 of the transmission unit 21. The handle unit 5 is provided with switches such as a main switch.

[Structure of Drive Unit]

Figure 3:
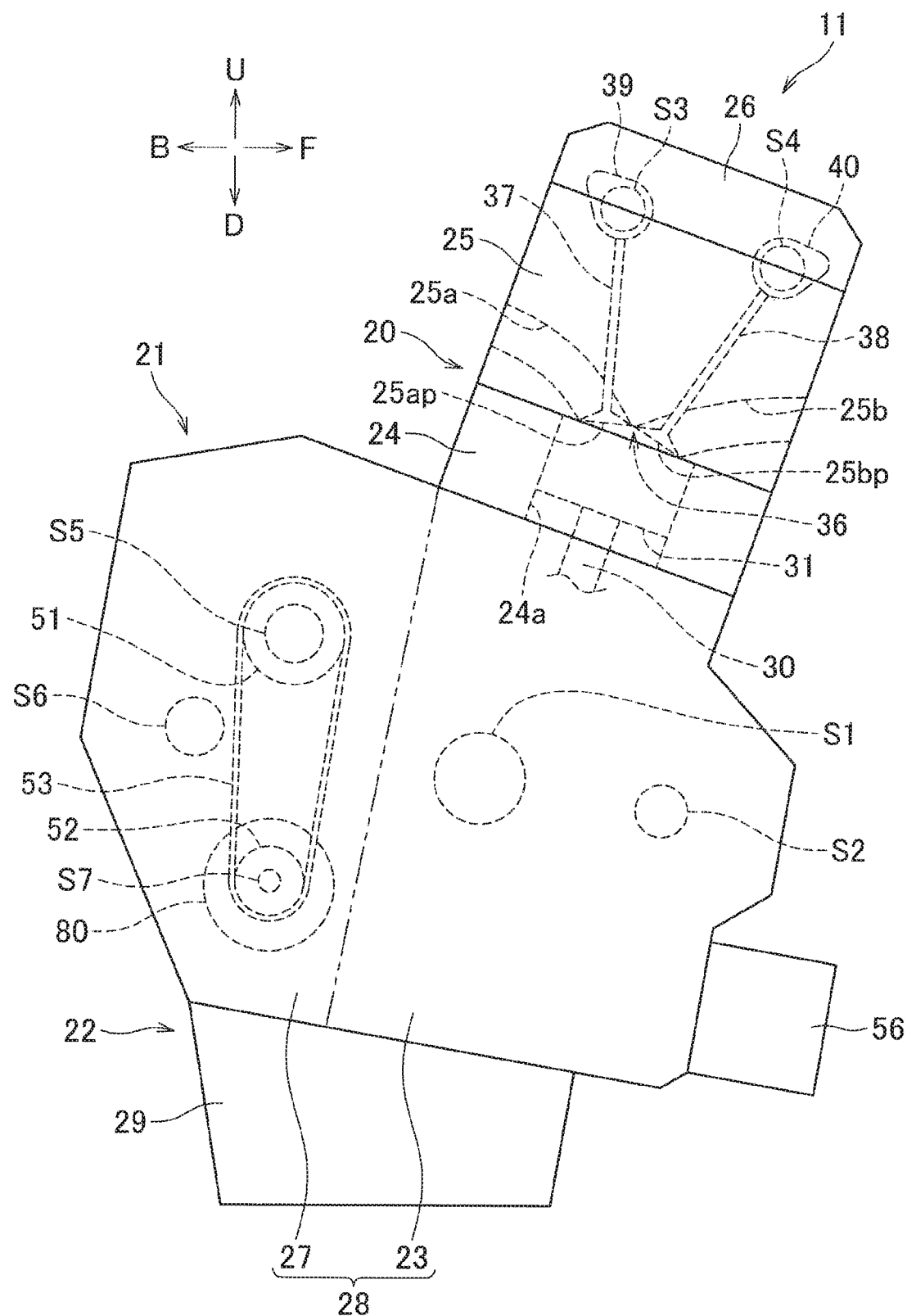
FIG. 3 is a right side view of a drive unit of Specific Example 1 of the embodiment.

As shown in FIG. 3, the drive unit 11 includes an engine main body unit 20, a transmission unit 21, and a shared lubrication oil supply mechanism 22. The shared lubrication oil supply mechanism 22 is configured to supply shared lubrication oil to each of the components of the engine main body unit 20 and the transmission unit 21. The shared lubrication oil lubricates both the engine main body unit 20 and the transmission unit 21.

As shown in FIG. 3, the drive unit 11 includes a crankshaft S1, a balance shaft S2, an intake cam shaft S3, an exhaust cam shaft S4, an input shaft S5, an output shaft S6, and an oil pump shaft S7. These rotational shafts S1 to S7 are in parallel to one another. These rotational shafts S1 to S7 are provided along the left-right direction (vehicle width direction). The crankshaft S1, the balance shaft S2, the intake cam shaft S3, and the exhaust cam shaft S4 are included in the engine main body unit 20. The input shaft S5 and the output shaft S6 are included in the transmission unit 21.

The drive unit 11 includes an oil pan 29, a drive unit case 28, a cylinder body 24, a cylinder head 25, and a head cover 26. The head cover 26 forms an upper part of the drive unit 11. The cylinder head 25 is connected to a lower end portion of the head cover 26. The cylinder body 24 is connected to a lower end portion of the cylinder head 25. The drive unit case 28 is connected to a lower end portion of the cylinder body 24.

Figure 4:
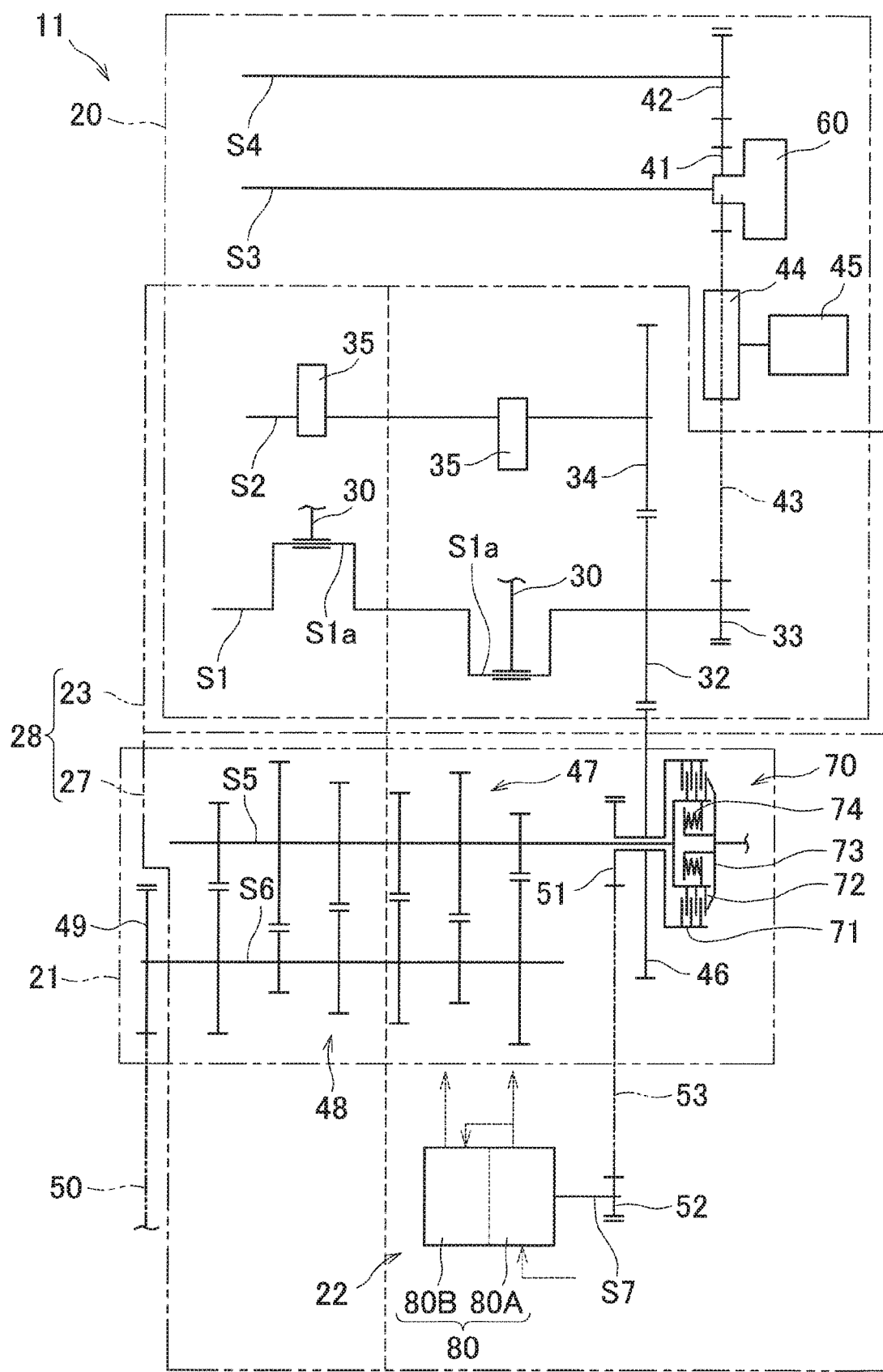
FIG. 4 shows an outline of a drive unit of Specific Example 1 of the embodiment.

As shown in FIG. 3, the drive unit case 28 includes a crankcase member 23 and a transmission case member 27. The drive unit case 28 is formed by combining a plurality of components. Each of the components constituting the drive unit case 28 is formed by using a die, e.g., by casting. At least a part of the crankcase member 23 and at least a part of the transmission case member 27 are integrally molded. A two-dot chain line in FIG. 3 indicates the border between the crankcase member 23 and the transmission case member 27. The position of the border, however, is not limited to this. The border between the crankcase member 23 and the transmission case member 27 may partially include a border formed by connecting independent members with each other, or may not include such a border at all. The drive unit case 28 may, for example, be constituted by a left case constituting the left part of the drive unit case 28 and a right case provided to the right of the left case. FIG. 4 shows, by a dotted line, an example of the border between the left case and the right case. The left case and the right case are connected to each other by, for example, a bolt.

The crankcase member 23 houses the crankshaft S1 and the balance shaft S2. The crankshaft crankcase member 23 rotatably supports the crankshaft S1 and the balance shaft S2. The transmission case member 27 houses at least a part of the input shaft S5. The transmission case member 27 houses most of the output shaft S6. The transmission case member 27 houses the oil pump shaft S7. The transmission case member 27 rotatably supports the input shaft S5, the output shaft S6, and the oil pump shaft S7. The engine main body unit 20 includes the crankcase member 23, the cylinder body 24, the cylinder head 25, and the head cover 26. The transmission unit 21 includes the transmission case member 27. The shared lubrication oil supply mechanism 22 includes the oil pan 29.

The engine main body unit 20 will be described in the following.

The engine main body unit 20 is a water-cooled engine. As shown in FIG. 2, the engine main body unit 20 is connected to a water cooling unit 15. The water cooling unit 15 is configured to cool high-temperature coolant (e.g., water) discharged from the engine main body unit 20 and to return the coolant to the engine main body unit 20. The engine main body unit 20 is a two-cylinder engine including two combustion chambers 36. The engine main body unit 20 is a 4-stroke 1-cycle engine (4-stroke engine) which repeats, in each cylinder, an intake process, a compression process, a combustion process (expansion process), and an exhaust process. The combustion process is performed at different timings in the respective two combustion chambers 36.

As shown in FIG. 4, the crankshaft S1 includes two crank pins S1a each of which is eccentric from the rotational axis of the crankshaft S1. Each crank pin S1a is connected to a connecting rod 30. As shown in FIG. 3, each connecting rod 30 is connected to a piston 31. As shown in FIG. 4, a drive gear 32 and a crank sprocket 33 are provided on the crankshaft S1. The crank sprocket 33 is equivalent to a crank rotational body of the present teaching. The drive gear 32 and the crank sprocket 33 rotate together with the crankshaft S1. Although not illustrated, the crankshaft S1 is connected to a generator and a starter motor. The starter motor rotates the crankshaft S1 at the start of the engine. The generator generates electric power by the rotational force of the crankshaft S1. An ISG (Integrated Starter Generator: a generator with a motor function) in which the generator and the starter motor are integrated may be provided. At least a part of the drive gear 32 is housed in the crankcase member 23. At least a part of the crank sprocket 33 is housed in the crankcase member 23. At least a part of the generator is housed in the crankcase member 23. At least a part of the starter motor is housed in the crankcase member 23. At least a part of the drive gear 32 may be housed in the transmission case member 27. At least a part of the crank sprocket 33 may be housed in the transmission case member 27. At least a part of the generator may be housed in the transmission case member 27. At least a part of the starter motor may be housed in the transmission case member 27.

As shown in FIG. 4, a balance gear 34 and two balance weights 35 are provided on the balance shaft S2. The balance gear 34 and the balance weights 35 rotate together with the balance shaft S2. The balance gear 34 is engaged with the drive gear 32 of the crankshaft S1. For this reason, the balance shaft S2 always rotates when the crankshaft S1 rotates. To be more specific, the balance shaft S2 rotates in sync with the crankshaft S1. In other words, the rotation periods of these shafts are matched with each other. The ratio between the rotation periods of the shafts may be an integer ratio. The center of gravity of each balance weight 35 is eccentric from the rotational axis of the balance shaft S2. The balance shaft S2 restrains vibrations generated by reciprocation of the piston 31 and the connecting rod 30.

The cylinder body 24 includes two cylinder bores 24a (see FIG. 3). The two cylinder bores 24a are lined up along the left-right direction. The piston 31 is slidably housed in each cylinder bore 24a. A combustion chamber 36 is formed by a lower surface of the cylinder head 25, the cylinder bore 24a, and the piston 31. The engine main body unit 20 includes two combustion chambers 36. The engine main body unit 20 includes an ignition device (not illustrated). The ignition device is configured to ignite a mixture gas of fuel and air in the combustion chamber 36.

As shown in FIG. 3, the cylinder head 25 includes an intake passage 25a and an exhaust passage 25b for each combustion chamber 36. The intake passage 25a and the exhaust passage 25b are connected to the combustion chamber 36. In other words, the cylinder head 25 includes the two intake passages 25a and the two exhaust passages 25b, which are connected to the two combustion chambers 36. The intake passage 25a and the exhaust passage 25b are equivalent to gas passages of the present teaching. An end on the combustion chamber 36 side of the intake passage 25a will be referred to as an intake port 25ap. An end on the combustion chamber 36 side of the exhaust passage 25b will be referred to as an exhaust port 25bp. The number of the intake ports 25ap for one combustion chamber 36 may be one, or may be two or more. The same applies to the number of the exhaust ports 25bp. The intake passage 25a is a passage for introducing air into the combustion chamber 36. The exhaust passage 25b is a passage for exhausting combustion gas (exhaust gas) generated in the combustion chamber 36 during a combustion process. An intake valve 37 for opening and closing the intake port 25ap is provided on the intake passage 25a. The intake valve 37 is provided for each intake port 25ap. An exhaust valve 38 for opening and closing the exhaust port 25bp is provided on the exhaust passage 25b. The exhaust valve 38 is provided for each exhaust port 25bp.

The engine main body unit 20 is connected to an intake unit (not illustrated) and an exhaust unit 16 (see FIG. 2). The intake unit is configured to supply air to two intake passages 25a. The intake unit includes a throttle valve for adjusting an amount of supplied air. The opening degree of the throttle valve is changed by an operation of the accelerator grip 14. The exhaust unit 16 is configured to purify the exhaust gas exhausted from two exhaust passages 25b and exhaust the gas to the atmosphere. A fuel supplier such as an injector is provided on the exhaust passage 25b or the exhaust unit 16. The fuel supply amount and the timing of fuel supply are controlled by the controller.

As shown in FIG. 3, the intake cam shaft S3 and the exhaust cam shaft S4 are provided inside the cylinder head 25 and the head cover 26. The intake cam shaft S3 includes a plurality of intake cams 39. Each intake cam 39 rotates together with the intake cam shaft S3. The exhaust cam shaft S4 includes a plurality of exhaust cams 40. Each exhaust cam 40 rotates together with the exhaust cam shaft S4. The intake cams 39 are in contact with upper end portions of the intake valves 37, respectively. The exhaust cams 40 are in contact with upper end portions of the exhaust valves 38, respectively. A shim may be provided between the intake cam 39 and the upper end portion of the intake valve 37. A shim may be provided between the exhaust cam 40 and the exhaust valve 38. This shim is a member for adjusting the valve clearance. Each of the valves 37 and 38 is biased to the closing direction by a valve spring (not illustrated). In accordance with the rotation of the cam shafts S3 and S4, the cams 39 and 40 press the valves 37 and 38 in the opening direction against the biasing forces of the valve springs.

As shown in FIG. 4, an intake cam sprocket 41 is provided on the intake cam shaft S3. The intake cam sprocket 41 is equivalent to a cam rotational body of the present teaching. The intake cam sprocket 41 is connected to the intake cam shaft S3 via a variable valve timing device 60. The rotational force of the intake cam sprocket 41 is transmitted to the intake cam shaft S3 via the variable valve timing device 60. The variable valve timing device 60 is included in the engine main body unit 20. The variable valve timing device 60 is configured to change the phase of the intake cam shaft S3 with respect to the intake cam sprocket 41. In other words, the variable valve timing device 60 changes the timings to open and close the intake valve 37. The variable valve timing device 60 is driven by hydraulic pressure of the shared lubrication oil. A publicly-known variable valve timing device is used as the variable valve timing device 60. The following will describe an example of the variable valve timing device 60.

Figure 6A:
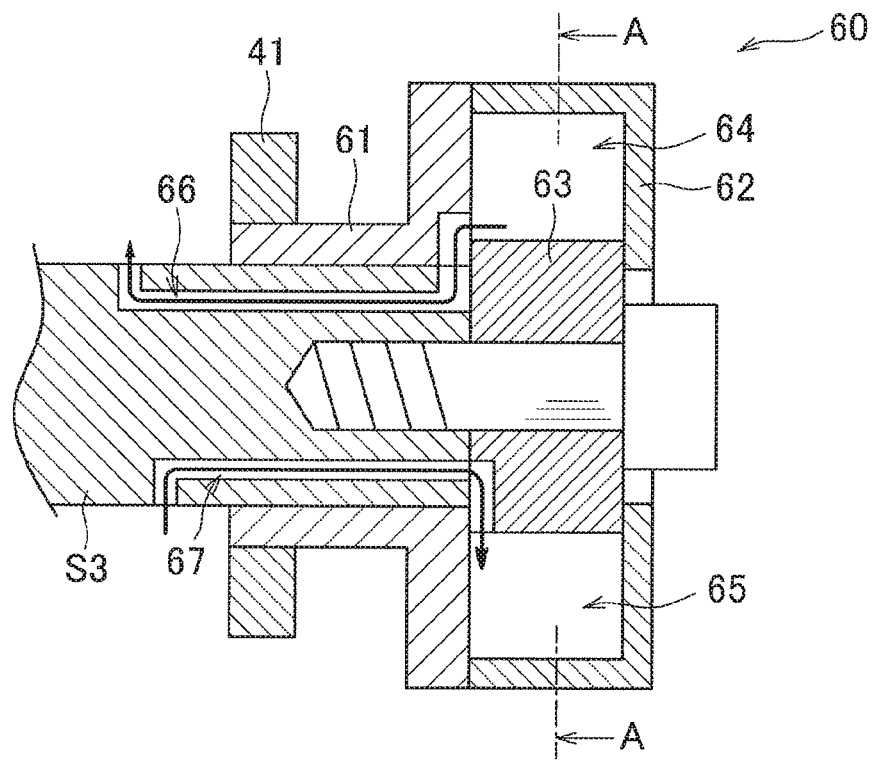
FIG. 6A is a schematic cross section of a variable valve timing device of the drive unit of Specific Example 1 of the embodiment.

As shown in FIG. 6A, the variable valve timing device 60 includes a boss portion 61, a housing portion 62, and a rotor 63. The boss portion 61 is provided on the intake cam shaft S3 to be relatively rotatable. The intake cam sprocket 41 and the housing portion 62 are connected to the boss portion 61. The intake cam sprocket 41, the boss portion 61, and the housing portion 62 rotate together. The rotor 63 is fixed to the intake cam shaft S3 by a bolt, and rotates together with the intake cam shaft S3. The housing portion 62 houses the rotor 63.

Figure 6B:
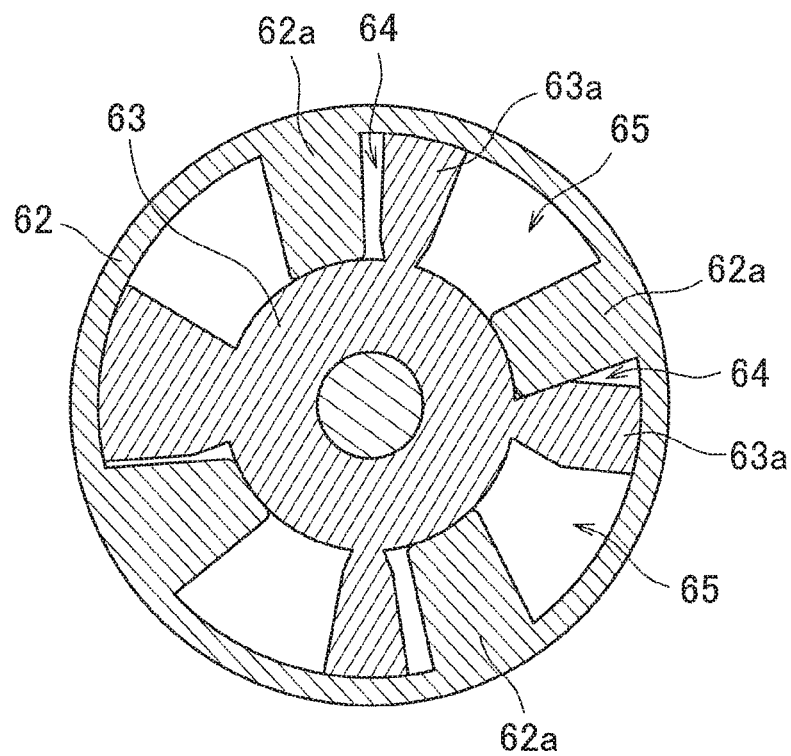
FIG. 6B is a cross section taken at the A-A line in FIG. 6A.

As shown in FIG. 6B, the housing portion 62 includes a cylindrical portion and a plurality of partition wall portions 62a protruding from the inner circumferential surface of the cylindrical portion. The partition wall portions 62a are lined up in the circumferential direction. The rotor 63 includes a cylindrical portion and a plurality of vanes 63a protruding from the outer circumferential surface of the cylindrical portion. The vanes 63a are lined up in the circumferential direction. Each vane 63a is provided between neighboring partition wall portions 62a. On both sides of each vane 63a, an advanced angle chamber 64 and a retarded angle chamber 65 are formed, respectively. Each advanced angle chamber 64 is formed between one side face of each vane 63a and the partition wall portion 62a, whereas each retarded angle chamber 65 is formed between the other side face of each vane 63a and the partition wall portion 62a. Furthermore, as shown in FIG. 6A, an advanced angle passage 66 is formed in the intake cam shaft S3 and the boss portion 61 to allow the advanced angle chamber 64 to communicate with the outside. Furthermore, a retarded angle passage 67 is formed in the intake cam shaft S3 and the rotor 63 to allow the retarded angle chamber 65 to communicate with the outside.

When the shared lubrication oil is supplied from the retarded angle passage 67 to the retarded angle chamber 65, the rotor 63 rotates in the retarded angle direction relative to the housing portion 62. As a result, the phase of the intake cam shaft S3 changes and the timing to open the intake valve 37 changes to the retarded angle side. At this stage, the shared lubrication oil in the advanced angle chamber 64 is exhausted from the advanced angle passage 66. FIG. 6A and FIG. 6B show the most retarded angle state. Meanwhile, when the shared lubrication oil is supplied from the advanced angle passage 66 to the advanced angle chamber 64, the rotor 63 rotates in the advanced angle direction relative to the housing portion 62. As a result, the phase of the intake cam shaft S3 changes and the timing to open the intake valve 37 changes to the advanced angle side.

As shown in FIG. 4, an exhaust cam sprocket 42 is provided on the exhaust cam shaft S4. The exhaust cam sprocket 42 is equivalent to the cam rotational body of the present teaching. The exhaust cam sprocket 42 rotates together with the exhaust cam shaft S4. A cam chain 43 is wound onto the intake cam sprocket 41, the exhaust cam sprocket 42, and the crank sprocket 33. The rotational force of the crankshaft S1 is transmitted to the intake cam shaft S3 and the exhaust cam shaft S4 via the cam chain 43. In other words, intake cam shaft S3 and the exhaust cam shaft S4 are rotationally driven by the crankshaft S1. A belt may be provided in place of the cam chain 43. In this case, pulleys are provided in place of the sprockets 41, 42, and 33. The pulley provided in place of the sprocket 33 is equivalent to the crank rotational body of the present teaching. The pulley provided in place of the sprocket 41 is equivalent to the cam rotational body of the present teaching. The pulley provided in place of the sprocket 42 is equivalent to the cam rotational body of the present teaching, too. The cam chain 43 and the belt are equivalent to the winding member of the present teaching.

Figure 5:
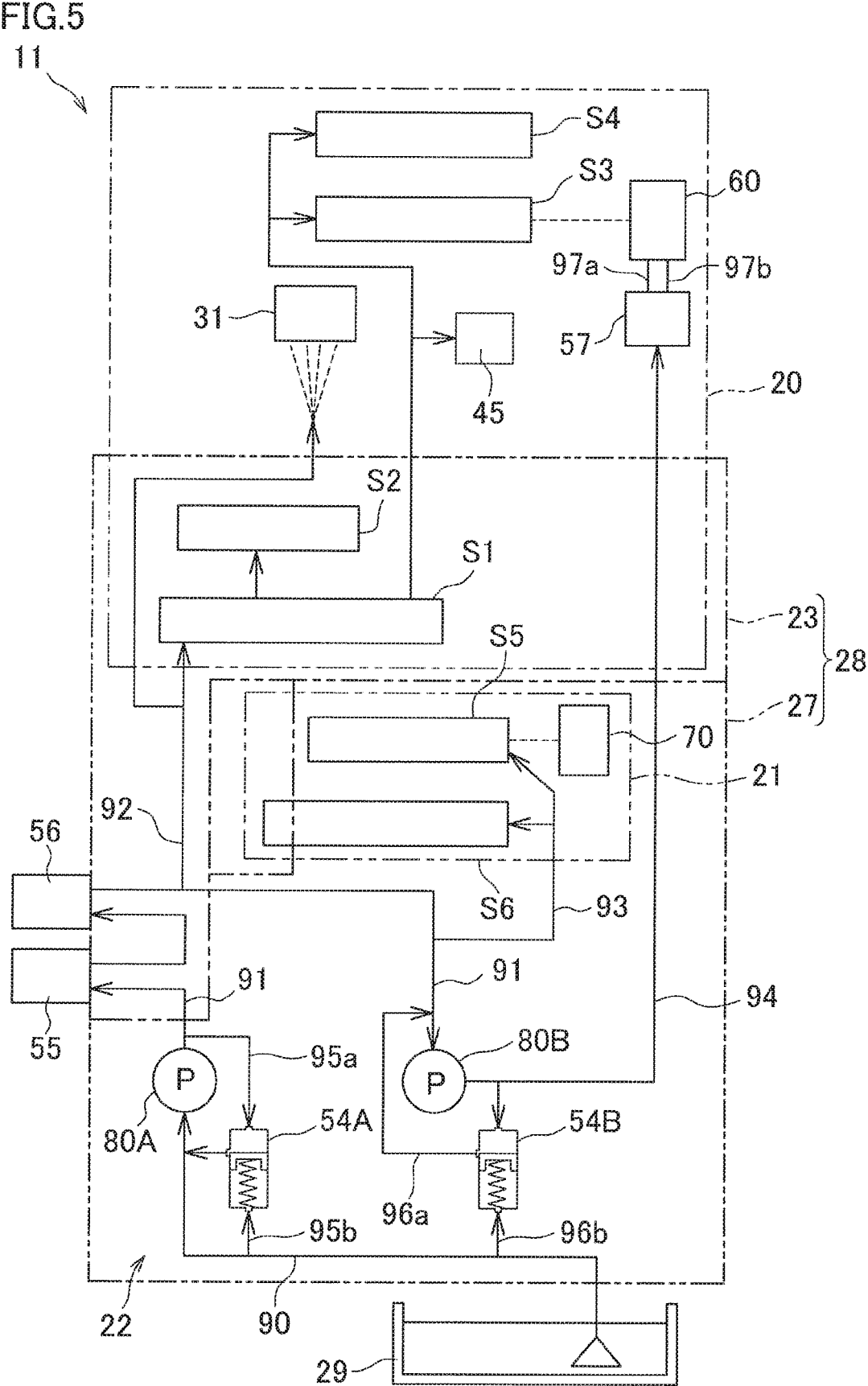
FIG. 5 shows paths of shared lubrication oil in the drive unit of Specific Example 1 of the embodiment.

As shown in FIG. 4, the engine main body unit 20 includes a chain guide 44 and a tensioner device 45. The chain guide 44 is provided to be in contact with the outer periphery of the cam chain 43. The tensioner device 45 presses the chain guide 44 to impart adequate tension to the cam chain 43. The tensioner device 45 is driven by hydraulic pressure of the shared lubrication oil. A publicly-known hydraulic tensioner device is used as the tensioner device 45. The structure of the tensioner device 45 is not described. As shown in FIG. 4 and FIG. 5, the tensioner device 45 is not housed in the drive unit case 28. The tensioner device 45 is housed in the cylinder body 24 or the cylinder head 25. The tensioner device 45 may be housed in the crankcase member 23.

The following will describe the transmission unit 21.

As shown in FIG. 4, a driven gear 46 is provided on the input shaft S5 to be relatively rotatable. The driven gear 46 is engaged with the drive gear 32 of the crankshaft S1. For this reason, the driven gear 46 always rotates when the crankshaft S1 rotates. At least a part of the driven gear 46 is housed in the transmission case member 27. The driven gear 46 is not housed in the crankcase member 23. A part of the driven gear 46 may be housed in the crankcase member 23. A clutch device 70 is provided at an end portion of the input shaft S5. The clutch device 70 is included in the transmission unit 21. At least a part of the clutch device 70 is housed in the transmission case member 27. The clutch device 70 is not housed in the crankcase member 23. A part of the clutch device 70 may be housed in the crankcase member 23. A publicly-known clutch device is used as the clutch device 70. The following will describe a case where the clutch device 70 is a multiplate wet clutch.

The clutch device 70 includes a clutch outer 71, a clutch inner 72, a pressure plate 73, and clutch springs 74. The clutch outer 71 is provided on the input shaft S5 to be relatively rotatable. The clutch outer 71 is connected to the driven gear 46 to be rotatable together with the driven gear 46. The clutch inner 72 is connected to the input shaft S5 to be rotatable together with the input shaft S5. Each of the clutch outer 71 and the clutch inner 72 includes a plurality of friction plates. The friction plates of the clutch outer 71 and the friction plates of the clutch inner 72 are alternately provided.

When a clutch lever (not illustrated) is not operated, the pressure plate 73 presses the friction plates of the clutch outer 71 onto the friction plates of the clutch inner 72 by a biasing force of the clutch springs 74. As a friction force is generated between the friction plates, the rotational force of the clutch outer 71 is transmitted to the clutch inner 72. As a result, the rotational force of the crankshaft S1 is transmitted to the input shaft S5 via the drive gear 32, the driven gear 46, and the clutch device 70. In other words, the input shaft S5 is rotationally driven by the crankshaft S1. When the clutch lever (not illustrated) is operated, the pressure plate 73 is driven in the direction opposite to the direction of biasing by the clutch springs 74, by an unillustrated actuator. As a result, the transmission of the rotational force from the clutch outer 71 to the clutch inner 72 is cut off. In this way, the clutch device 70 switches between a connection state in which the rotational force of the crankshaft S1 is transmitted to the input shaft S5 and a cut-off state in which the force is not transmitted. The structure of the clutch device 70 is not limited to the structure described above. For example, the clutch device 70 may be a dry clutch. Alternatively, the clutch device 70 may be a centrifugal clutch.

A transmission gear group 47 constituted by a plurality of transmission gears is provided on the input shaft S5. A transmission gear group 48 engaged with the transmission gear group 47 of the input shaft S5 is provided on the output shaft S6. The transmission ratio is selected by the rider operating the shift pedal. The transmission unit 21 is configured to transmit the rotational force of the input shaft S5 to the output shaft S6 via the transmission gears with a combination corresponding to the selected transmission ratio. In other words, the output shaft S6 is rotationally driven by the input shaft S5. An output sprocket 49 is provided on the output shaft S6. A chain 50 is wound onto the output sprocket 49 and a sprocket (not illustrated) provided at the rear wheel 3. The rotational force of the output shaft S6 is transmitted to the rear wheel 3 via the chain 50. In this way, the transmission unit 21 transmits the rotational force of the crankshaft S1 to the rear wheel 3 after the transmission at a predetermined transmission ratio. As shown in FIG. 4, at least a part of the transmission gear group 47 is housed in the transmission case member 27. At least a part of the transmission gear group 48 is housed in the transmission case member 27. The output sprocket 49 is not housed in the drive unit case 28. The output sprocket 49 is exposed to the outside of the drive unit case 28. A part of the output shaft S6 is therefore not housed in the drive unit case 28.

As shown in FIG. 3 and FIG. 4, a pump drive sprocket 51 is provided on the input shaft S5 to be relatively rotatable. The pump drive sprocket 51 is connected to the driven gear 46. The pump drive sprocket 51 rotates together with the driven gear 46. A pump sprocket 52 is provided on the oil pump shaft S7. The pump sprocket 52 is equivalent to the pump rotational body of the present teaching. The pump sprocket 52 rotates together with the oil pump shaft S7. A pump chain 53 is wound onto the pump sprocket 52 of the oil pump shaft S7 and the pump drive sprocket 51 of the input shaft S5. The oil pump shaft S7 is therefore rotated by the rotational force of the input shaft S5. The rotational force of the crankshaft S1 is transmitted to the oil pump shaft S7 via the drive gear 32, the driven gear 46, the pump drive sprocket 51, the pump chain 53, and the pump sprocket 52. The oil pump shaft S7 always rotates when the crankshaft S1 rotates. At least a part of the pump drive sprocket 51 is housed in the transmission case member 27. The pump drive sprocket 51 is not housed in the crankcase member 23. A part of the pump drive sprocket 51 may be housed in the crankcase member 23. At least a part of the pump sprocket 52 is housed in the transmission case member 27.

The following will describe the shared lubrication oil supply mechanism 22.

The shared lubrication oil supply mechanism 22 includes a pump device 80. As shown in FIG. 3 and FIG. 4, the pump device 80 is provided on the oil pump shaft S7. The pump device 80 is housed in the drive unit case 28. The pump device 80 is housed in the transmission case member 27. The pump device 80 is driven by the oil pump shaft S7. The pump device 80 is therefore rotated by the rotational force of the driven gear 46 on the input shaft S5. To put it differently, the pump device 80 is driven by the rotational force of the crankshaft S1.

Figure 7A:
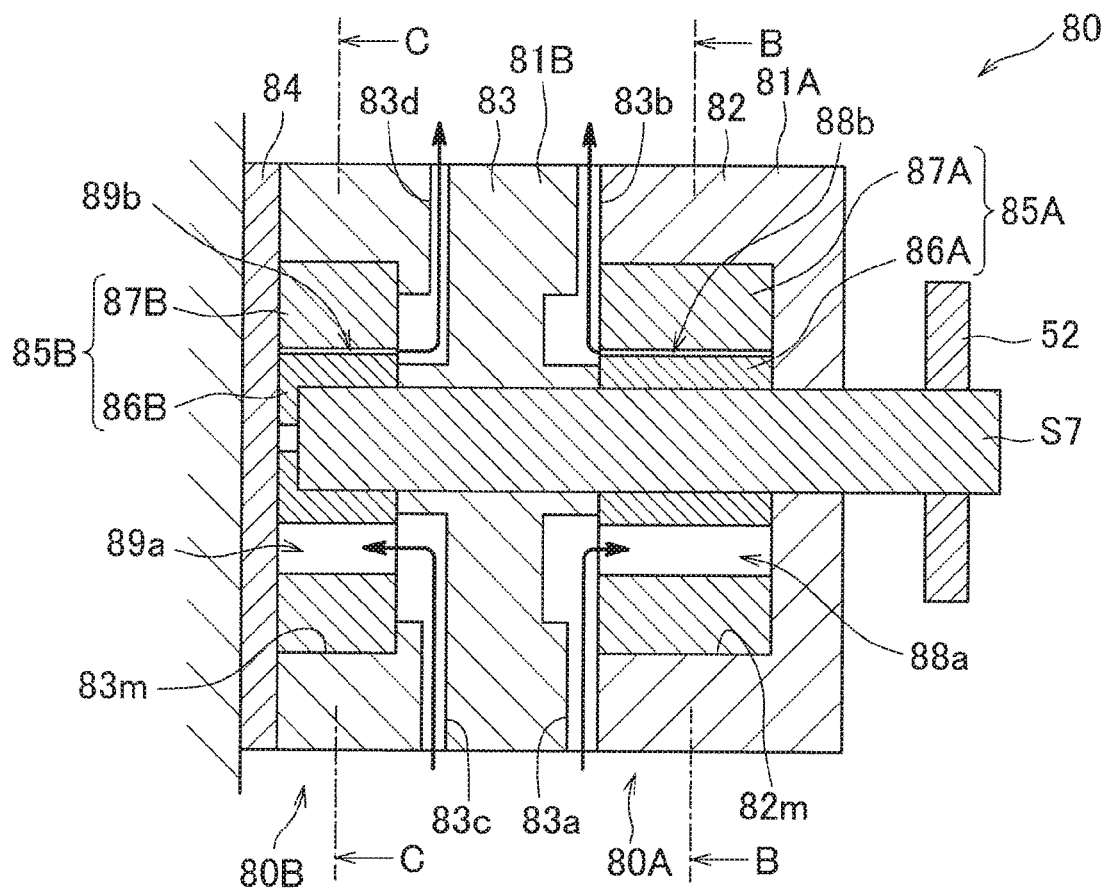
FIG. 7A is a schematic cross section of a first booster pump and a second booster pump of the drive unit of Specific Example 1 of the embodiment.

As shown in FIG. 7A, the pump device 80 includes a housing member 82, a housing member 83, a cover 84, a first booster pump main body 85A, and a second booster pump main body 85B. The pump device 80 is a trochoid pump. The pump device 80 has a structure in which two booster pumps 80A and 80B are integrated. The two booster pumps 80A and 80B are arranged side by side on a single shaft. The first booster pump 80A is constituted by the first booster pump main body 85A and a first housing 81A in which the first booster pump main body 85A is housed. The first housing 81A is constituted by the housing member 82 and the housing member 83. The second booster pump 80B is constituted by the second booster pump main body 85B and a second housing 81B in which the second booster pump main body 85B is housed. The second housing 81B is constituted by the housing member 83 and the cover 84. The housing member 83 is encompassed in both the first housing 81A and the second housing 81B. In other words, a part of the first housing 81A is also a part of the second housing 81B.

The housing member 82, the housing member 83, and the cover 84 are provided on the oil pump shaft S7 to be relatively rotatable. The housing member 82, the housing member 83, and the cover 84 are lined up in this order in the direction in parallel to the rotational axis of the oil pump shaft S7. The housing member 82, the housing member 83, and the cover 84 are directly or indirectly fixed to the transmission case member 27. A circular recess 82*m* is formed in a face of the housing member 82, the face opposing the housing member 83. The first booster pump main body 85A is provided in this recess 82*m*. A circular recess 83*m* is formed in a face of the housing member 83, the face opposing the cover 84. The second booster pump main body 85B is provided in this recess 8*m*.

Figure 7B:
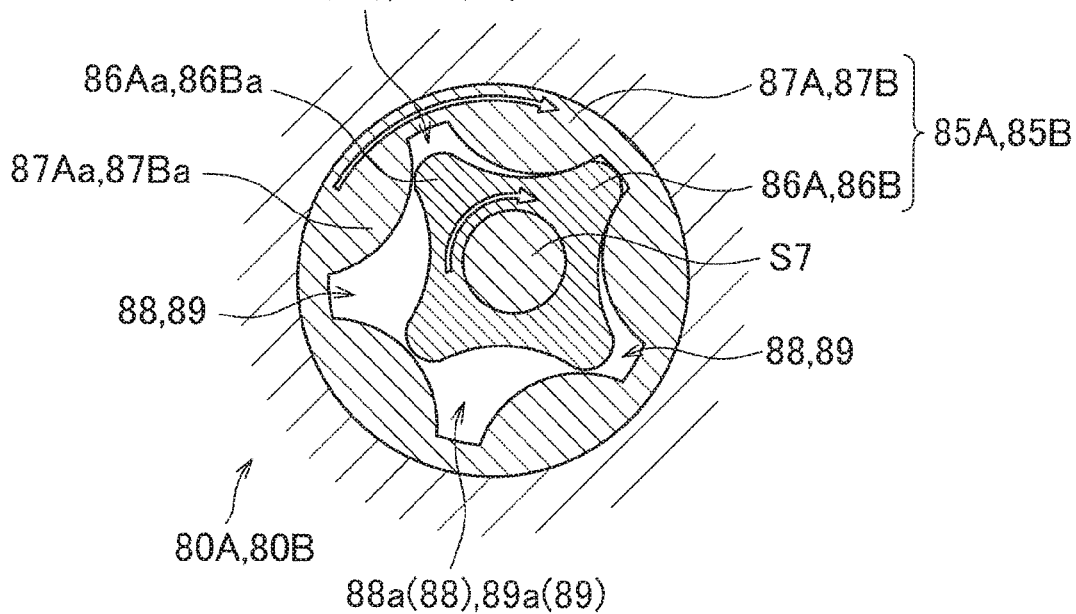
FIG. 7B is a cross section taken at the B-B line and the C-C line in FIG. 7A.

The first booster pump main body 85A includes a first inner rotor 86A and a first outer rotor 87A. As shown in FIG. 7B, each of the first inner rotor 86A and the first outer rotor 87A is substantially cylindrical in shape. FIG. 7B is both a cross section taken at the B-B line in FIG. 7A and a cross section taken at the C-C line in FIG. 7A. The first outer rotor 87A is provided at the circular recess 82*m* of the housing member 82 to be relatively rotatable. The first inner rotor 86A is provided inside the first outer rotor 87A. The oil pump shaft S7 penetrates a hole which is formed at the center of the first inner rotor 86A. The first inner rotor 86A rotates together with the oil pump shaft S7. A plurality of outer teeth 86A*a* are provided at the outer periphery of the first inner rotor 86A. A plurality of inner teeth 87A*a* are provided at the inner periphery of the first outer rotor 87A.

The number (4) of inner teeth 87Aa is smaller than the number (5) of outer teeth 86Aa. The center of the outer circumferential surface of the first outer rotor 87A is eccentric from the rotational axis of the oil pump shaft S7. For this reason, the center of the outer teeth 86Aa in the circumferential direction is eccentric from the center of the inner teeth 87Aa in the circumferential direction. When the first inner rotor 86A rotates on account of the rotation of the oil pump shaft S7, one of the outer teeth 86Aa is engaged with the inner tooth 87Aa. As a result, the first outer rotor 87A is rotationally driven by the first inner rotor 86A. In accordance with the rotation of the oil pump shaft S7, a combination of the outer tooth 86Aa and the inner tooth 87Aa which are engaged with each other changes. A plurality of pump chambers 88 are formed between the first inner rotor 86A and the first outer rotor 87A. The pump chambers 88 are mutually different from one another in shape. In accordance with the rotation of the first inner rotor 86A and the first outer rotor 87A, the capacity of each pump chamber 88 varies.

The second booster pump main body 85B includes a second inner rotor 86B and a second outer rotor 87B. When viewed in the direction in parallel to the rotational axis of the oil pump shaft S7, the second inner rotor 86B is substantially identical in shape to the first inner rotor 86A. When viewed in the direction parallel to the rotational axis of the oil pump shaft S7, the second outer rotor 87B is substantially identical in shape to the first outer rotor 87A. As shown in FIG. 7A, the second outer rotor 87B is provided at the circular recess 83m of the housing member 83 to be relatively rotatable. Being similar to the first inner rotor 86A, the second inner rotor 86B rotates together with the oil pump shaft S7. A plurality of outer teeth 86Ba are provided at the outer periphery of the second inner rotor 86B. A plurality of inner teeth 87Ba are provided at the inner periphery of the second outer rotor 87B. A plurality of pump chambers 89 are formed between the second inner rotor 86B and the second outer rotor 87B. The second inner rotor 86B and the second outer rotor 87B are shorter than the first inner rotor 86A and the first outer rotor 87A, in the direction parallel to the rotational axis of the oil pump shaft S7. On this account, the total capacity of the pump chambers 89 of the second booster pump 80B is smaller than the total capacity of the pump chambers 88 of the first booster pump 80A.

The housing member 83 includes a first suction passage 83a, a first discharge passage 83b, a second suction passage 83c, and a second discharge passage 83d, which are provided inside the housing member 83. The shapes of the passages 83a to 83d are not limited to the shapes shown in FIG. 7A. One end of the first suction passage 83a is connected to a first suction pump chamber 88a among the pump chambers 88 of the first booster pump 80A. The other end of the first suction passage 83a is formed at the outer surface of the first booster pump 80A. The number of the first suction pump chambers 88a may be one or may be two or more. One end of the first discharge passage 83b is connected to a first discharge pump chamber 88b among the pump chambers 88 of the first booster pump 80A. The other end of the first discharge passage 83b is formed at the outer surface of the first booster pump 80A. The number of the first discharge pump chambers 88b is preferably one. The number of the first discharge pump chambers 88b may be two or more. The first suction pump chamber 88a and the first discharge pump chamber 88b are included in the pump chambers 88. The capacity of the first discharge pump chamber 88b is smaller than the capacity of the first suction pump chamber 88a. A pump chamber 88 becomes the first suction pump chamber 88a when its capacity increases in accordance with the rotation of the oil pump shaft S7. After becoming the first suction pump chamber 88a, the pump chamber 88 becomes the first discharge pump chamber 88b when its capacity decreases in accordance with the rotation of the oil pump shaft S7. The first suction pump chamber 88a sucks the shared lubrication oil from the first suction passage 83a. When the first suction pump chamber 88a becomes the first discharge pump chamber 88b, the shared lubrication oil is compressed in the first discharge pump chamber 88b. The first discharge pump chamber 88b discharges the compressed shared lubrication oil to the first discharge passage 83b. Hereinafter, an inflow port of the first suction passage 83a, through which the shared lubrication oil flows in, may be referred to as an inlet of the first booster pump 80A. An outflow port of the first discharge passage 83b, through which the shared lubrication oil is discharged, may be referred to as an outlet of the first booster pump 80A.

One end of the second suction passage 83c is connected to a second suction pump chamber 89a among the pump chambers 89 of the second booster pump 80B. The other end of the second suction passage 83c is formed at the outer surface of the second booster pump 80B. The number of the second suction pump chambers may be one or may be two or more. One end of the second discharge passage 83d is connected to a second discharge pump chamber 89b among the pump chambers 89 of the second booster pump 80B. The other end of the second discharge passage 83d is formed at the outer surface of the second booster pump 80B. The number of the second discharge pump chambers 89b is preferably one. The number of the second discharge pump chambers 89b may be two or more. The second suction pump chamber 89a and the second discharge pump chamber 89b are included in the pump chambers 89. The capacity of the second discharge pump chamber 89b is smaller than the capacity of the second suction pump chamber 89a. A pump chamber 89 becomes the second suction pump chamber 89a when its capacity increases in accordance with the rotation of the oil pump shaft S7. After becoming the second suction pump chamber 89a, the pump chamber 89 becomes the second discharge pump chamber 89b when its capacity decreases in accordance with the rotation of the oil pump shaft S7. The second suction pump chamber 89a sucks the shared lubrication oil from the second suction passage 83c. When the second suction pump chamber 89a becomes the second discharge pump chamber 89b, the shared lubrication oil is compressed in the second discharge pump chamber 89b. The second discharge pump chamber 89b discharges the compressed shared lubrication oil to the second discharge passage 83d. Hereinafter, an inflow port of the second suction passage 83c, through which the shared lubrication oil flows in, may be referred to as an inlet of the second booster pump 80B. An outflow port of the second discharge passage 83d, through which the shared lubrication oil is discharged, may be referred to as an outlet of the second booster pump 80B.

As shown in FIG. 5, the shared lubrication oil supply mechanism 22 includes the oil pan 29 in addition to the first booster pump 80A and the second booster pump 80B. The shared lubrication oil supply mechanism 22 includes two relief valves 54A and 54B. The shared lubrication oil supply mechanism 22 includes an oil cooler 55 and an oil cleaner 56. The shared lubrication oil supply mechanism 22 includes an oil control valve 57. The shared lubrication oil supply mechanism 22 is configured to supply the shared lubrication oil stored in the oil pan 29 to each of the components of the engine main body unit 20 and the transmission unit 21.

Furthermore, the shared lubrication oil supply mechanism 22 includes a first oil passage member 90, a second oil passage member 91, a third oil passage member 92, a fourth oil passage member 93, a fifth oil passage member 94, bypass passage members 95a and 96a, pressure introduction passage members 95b and 96b, an advanced angle passage 97a, and a retarded angle passage 97b. In this specification, a passage member is, for example, wall members forming a passage by surrounding the passage. A part of the shared lubrication oil supply mechanism 22 is formed in the drive unit case 28. A part of the shared lubrication oil supply mechanism 22 is formed in the transmission case member 27. A part of the shared lubrication oil supply mechanism 22 is formed in the crankcase member 23. As shown in FIG. 3 and FIG. 5, at least a part of the oil cleaner 56 is provided outside the drive unit case 28. As shown in FIG. 5, at least a part of the oil cooler 55 is provided outside the drive unit case 28.

The first oil passage member 90 connects the oil pan 29 to the inlet of the first booster pump 80A. The second oil passage member 91 connects the outlet of the first booster pump 80A with the inlet of the second booster pump 80B. To put it differently, the second oil passage member 91 connects the first discharge passage 83b of the first booster pump 80A with the second suction passage 83c of the second booster pump 80B. The first discharge pump chamber 88b of the first booster pump 80A communicates with the second suction pump chamber 89a of the second booster pump 80B via the first discharge passage 83b, a passage in the second oil passage member 91, and the second suction passage 83c. The oil cooler 55 and the oil cleaner 56 are provided in the second oil passage member 91.

The third oil passage member 92 and the fourth oil passage member 93 are passage members branched from the second oil passage member 91. The third oil passage member 92 is connected to the crankshaft S1, the balance shaft S2, the cam shafts S3 and S4, and the tensioner device 45. The third oil passage member 92 has an injection port from which the shared lubrication oil is injected toward the piston 31. The fourth oil passage member 93 is connected to the input shaft S5 and the output shaft S6.

The fifth oil passage member 94 connects the outlet of the second booster pump 80B to the oil control valve 57. The oil control valve 57 is connected to the variable valve timing device 60 via the advanced angle passage 97a and the retarded angle passage 97b. The oil control valve 57 is controlled by a controller (not illustrated). The oil control valve 57 switches between a state in which the shared lubrication oil is supplied to the variable valve timing device 60 via the advanced angle passage 97a and a state in which the shared lubrication oil is supplied to the variable valve timing device 60 via the retarded angle passage 97b.

The bypass passage member 95a is connected to the first oil passage member 90 while bypassing the first booster pump 80A. The first relief valve 54A is provided in this bypass passage member 95a. The pressure introduction passage member 95b connects the first relief valve 54A to the first oil passage member 90. The first relief valve 54A switches the bypass passage member 95a between a communication state and a cutoff state in accordance with the pressure of the shared lubrication oil supplied from the pressure introduction passage member 95b. The bypass passage member 96a is connected to the second oil passage member 91 and the fifth oil passage member 94 while bypassing the second booster pump 80B. The second relief valve 54B is provided in this bypass passage member 96a. The pressure introduction passage member 96b connects the second relief valve 54B to the first oil passage member 90. The second relief valve 54B switches the bypass passage member 96a between a communication state and a cutoff state in accordance with the pressure of the shared lubrication oil supplied from the pressure introduction passage member 96b.

As shown in FIG. 5, at least a part of the first oil passage member 90 is formed in the drive unit case 28. At least a part of the second oil passage member 91 is formed in the drive unit case 28. At least a part of the third oil passage member 92 is formed in at least one of the drive unit case 28, the cylinder body 24, or the cylinder head 25. At least a part of the fourth oil passage member 93 is formed in the drive unit case 28. The fourth oil passage member 93 may not be formed in the drive unit case 28. At least a part of the fifth oil passage member 94 is formed in at least one of the drive unit case 28, the cylinder body 24, or the cylinder head 25. As such, a part of the oil passage members in which the shared lubrication oil flows is formed in the drive unit case 28.

The following will describe the flow of the shared lubrication oil in the shared lubrication oil supply mechanism 22.

The shared lubrication oil stored in the oil pan 29 is sucked into the first booster pump 80A. The first booster pump 80A pressurizes and discharges the shared lubrication oil. The first relief valve 54A adjusts the pressure of the shared lubrication oil having been pressurized by the first booster pump 80A. The first relief valve 54A adjusts the pressure of the shared lubrication oil to not exceed a predetermined pressure. To be more specific, the first relief valve 54A is opened when the difference between the pressure of the shared lubrication oil flowing in the first relief valve 54A via the bypass passage member 95a and the pressure of the shared lubrication oil flowing in the first relief valve 54A via the pressure introduction passage member 95b is equal to or larger than a predetermined value. To put it differently, the first relief valve 54A is opened when the difference between the pressure of the shared lubrication oil discharged from the first booster pump 80A and the pressure of the shared lubrication oil sucked into the first booster pump 80A is equal to or larger than a predetermined value. As a result, a part of the shared lubrication oil discharged from the first booster pump 80A returns to the sucking side of the first booster pump 80A via the bypass passage member 95a.

The shared lubrication oil having been pressurized by the first booster pump 80A is cooled when passing through the oil cooler 55. Then the oil is filtrated by the oil cleaner 56. A part of the shared lubrication oil having passed the oil cleaner 56 is supplied to and lubricates the crankshaft S1, the balance shaft S2, the piston 31, and the cam shafts S3 and S4 of the engine main body unit 20. In other words, a part of the shared lubrication oil which has been pressurized by the first booster pump 80A and is in the positive pressure condition is supplied to the engine main body unit 20 without being further pressurized by the second booster pump 80B. A part of the shared lubrication oil having passed the crankshaft S1 is supplied to the tensioner device 45 so as to drive the tensioner device 45. In other words, the tensioner device 45 is operated by the shared lubrication oil which has been pressurized by the first booster pump 80A but is not pressurized by the second booster pump 80B, and is in the positive pressure condition. A part of the shared lubrication oil having passed the oil cleaner 56 is supplied to and lubricates the input shaft S5 and the output shaft S6 of the transmission unit 21. As shown in FIG. 4 and FIG. 5, a part of the shared lubrication oil which has passed the oil cleaner 56 and is in the positive pressure condition is supplied to the second booster pump 80B. FIG. 4 schematically shows, by dotted arrows, the flow of the shared lubrication oil to and from the first booster pump 80A and the second booster pump 80B. The pressure of the shared lubrication oil is maintained to be positive from the first discharge pump chamber 88*b* of the first booster pump 80A to the second suction pump chamber 89*a* of the second booster pump 80B. As described above, the first discharge pump chamber 88*b* communicates with the second suction pump chamber 89*a* via the first discharge passage 83*b*, a passage in the second oil passage member 91, and the second suction passage 83*c*. The first discharge passage 83*b*, the passage in the second oil passage member 91, and the second suction passage 83*c* are equivalent to the low-pressure communication passage of the present teaching.

The second booster pump 80B further pressurizes a part of the shared lubrication oil which has been pressurized by the first booster pump 80A and is in the positive pressure condition. The second relief valve 54B adjusts the pressure of the shared lubrication oil having been pressurized by the second booster pump 80B. The second relief valve 54B adjusts the pressure of the shared lubrication oil to not exceed a predetermined pressure. Specific operations of the second relief valve 54B are identical with those of the first relief valve 54A. The shared lubrication oil having been pressurized by both the first booster pump 80A and the second booster pump 80B is supplied to the variable valve timing device 60 via the oil control valve 57. The variable valve timing device 60 is therefore operated by high-pressure shared lubrication oil obtained by pressurizing, by the second booster pump 80B, part of the shared lubrication oil which has been pressurized by the first booster pump 80A. In this way, the high-pressure shared lubrication oil having been pressurized by both the first booster pump 80A and the second booster pump 80B is supplied to the engine main body unit 20. The shared lubrication oil supplied to each of the components of the engine main body unit 20 and the transmission unit 21 returns to the oil pan 29 via an unillustrated passage member.

As shown in FIG. 5, at least a part of the first oil passage member 90 is formed in the transmission case member 27. The first oil passage member 90 supplies the shared lubrication oil from the oil pan 29 to the first booster pump 80A. At least a part of the first oil passage member 90 is formed in the crankcase member 23. At least a part of the second oil passage member 91 is formed in the crankcase member 23. The second oil passage member 91 supplies the shared lubrication oil from the first booster pump 80A to the second booster pump 80B. At least a part of the second oil passage member 91 may be formed in the transmission case member 27. At least a part of the fifth oil passage member 94 is formed in the transmission case member 27. The fifth oil passage member 94 supplies the shared lubrication oil from the second booster pump 80B to the variable valve timing device 60. At least a part of the fifth oil passage member 94 may be formed in the crankcase member 23. The relationship between the paths of the shared lubrication oil in the shared lubrication oil supply mechanism 22 and the crankcase member 23 and the transmission case member 27 shown in FIG. 5 is an outline. The details of the relationship may be different from those shown in FIG. 5.

The above-described drive unit 11 of Specific Example 1 of the embodiment has the following characteristics.

The drive unit case 28 including the crankcase member 23 and the transmission case member 27 houses the first booster pump 80A and the second booster pump 80B. At least a part of the crankcase member 23 and at least a part of the transmission case member 27 are integrally molded. In other words, the engine main body unit 20 is integrated with the transmission unit 21. The drive unit 11 in which the engine main body unit 20 is integrated with the transmission unit 21 is required to be downsized. With regard to the drive unit 11 which is required to be downsized, increase in size of the drive unit 11 can be restrained while the booster pump functions are enhanced, as described above.

At least a part of the fifth oil passage member 94 (high-pressure oil passage member) is formed in the drive unit case 28. High-pressure shared lubrication oil obtained by pressurizing, by the second booster pump 80B, at least part of the shared lubrication oil which has been pressurized by the first booster pump 80A and is in a positive pressure condition flows in the fifth oil passage member 94. The drive unit 11 can therefore be downsized as compared to cases where no high-pressure oil passage member is formed in the drive unit case 28.

Part of the shared lubrication oil which has been pressurized by the first booster pump 80A and is in the positive pressure condition is supplied to at least one of the engine main body unit 20 or the transmission unit 21, without being further pressurized by the second booster pump 80B. The remaining part of the shared lubrication oil which has been pressurized by the first booster pump 80A and is in the positive pressure condition is supplied to at least one of the engine main body unit 20 or the transmission unit 21, after being further pressurized by the second booster pump 80B. This makes it possible to supply, to each supply target, shared lubrication oil with a pressure suitable for each supply target. It is therefore unnecessary to wastefully pressurize the shared lubrication oil. On this account, each of the booster pumps 80A and 80B can be downsized as compared to cases where the shared lubrication oil having been pressurized by two booster pumps is supplied to all supply targets. As a result, the increase in size of the drive unit 11 can be further restrained while the booster pump functions are enhanced.

The low-pressure communication passages (83*b*, 91, and 83*c*) which allow the first discharge pump chamber 88*b* of the first booster pump 80A to communicate with the second suction pump chamber 89*a* of the second booster pump 80B maintain the pressure of the shared lubrication oil, which has been pressurized by the first booster pump 80A and is in the positive pressure condition, to be in the positive pressure condition. On this account, the high-pressure shared lubrication oil obtained due to the pressurization by the second booster pump 80B is certainly higher than the pressure of the shared lubrication oil having been pressurized by the first booster pump 80A. As a result, the increase in size of the drive unit 11 can be further restrained while the booster pump functions are further enhanced.

At least one of the first booster pump 80A or the second booster pump 80B is driven by the rotational force of at least one of the rotational shafts of the engine main body unit 20 and the transmission unit 21. On this account, the spaces around the rotational shafts are further effectively utilized as compared to cases where two booster pumps are both electrically driven, and at least one of the booster pumps can be provided in the spaces. As a result, the increase in size of the drive unit 11 can be further restrained while the booster pump functions are enhanced.

High-pressure shared lubrication oil obtained by pressurizing, by the second booster pump 80B, at least part of the shared lubrication oil which has been pressurized by the first booster pump 80A and is in a positive pressure condition is supplied to a hydraulic apparatus (variable valve timing device 60). On this account, a high hydraulic pressure can be obtained without increasing the size of the booster pump, even if a high hydraulic pressure is required to drive the hydraulically-actuated device.

The variable valve timing device 60 is configured to change the timings to open and close the intake valve 37. The variable valve timing device 60 does not require a large amount of operating oil. However, a particularly high hydraulic pressure is required to obtain a sufficient operation speed. For this reason, the booster pump is significantly large in size in the known arrangement in which only one booster pump is used. According to Specific Example 1 of the embodiment, high-pressure shared lubrication oil obtained by pressurizing, by the second booster pump 80B, at least part of the shared lubrication oil which has been pressurized by the first booster pump 80A and is in a positive pressure condition is supplied to the variable valve timing device 60. As a result, the increase in size of the drive unit 11 can be further restrained while the booster pump functions are enhanced.

The first booster pump 80A and the second booster pump 80B are driven by the rotational force of the same rotational shaft. The first booster pump 80A and the second booster pump 80B are therefore easily provided on the same shaft. In Specific Example 1 of the embodiment, the first booster pump 80A and the second booster pump 80B are provided side by side on the same shaft. Furthermore, at least a part of the first housing 81A of the first booster pump 80A is also at least a part of the second housing 81B of the second booster pump 80B. The two booster pumps 80A and 80B can therefore be further downsized. As a result, the increase in size of the drive unit 11 can be further restrained while the booster pump functions are enhanced.

The two booster pumps 80A and 80B are driven by the rotational force of the driven gear 46 which is provided on the input shaft S5 to be relatively rotatable. The driven gear 46 always rotates when the crankshaft S1 rotates because this gear is engaged with the drive gear 32 which rotates together with the crankshaft S1. Because the discharge pressures of the booster pumps 80A and 80B can be stably secured, the booster pump functions are stable.

If a booster pump is provided on the crankshaft S1, the crankshaft S1 may be required to be long to secure a space where the booster pump is provided. Generally the crankshaft is longer by nature than the other rotational shafts. For this reason, when the crankshaft S1 is further elongated, the drive unit 11 may be disadvantageously large in the direction parallel to the rotational axis of the crankshaft S1.

In this regard, the booster pumps 80A and 80B are driven by the rotational force of the driven gear 46 provided on the input shaft S5. It is therefore possible to restrain the increase in size of the drive unit 11 in the direction parallel to the rotational axis, as compared to cases where a booster pump is provided on the crankshaft S1. Furthermore, a space where a booster pump is provided is easily found around the driven gear 46 on the input shaft S5, as compared to the vicinity of the crankshaft S1. As a result, the increase in size of the drive unit 11 can be further restrained while the booster pump functions are enhanced.

Specific Example 2 of Embodiment of Present Teaching

Specific Example 2 of the above-described embodiment of the present teaching will be described with reference to FIG. 8 to FIG. 10. Components having the same structure as those in Specific Example 1 will be given the same reference numerals, and the description thereof will be omitted, if appropriate. In a motorcycle of Specific Example 2 of the embodiment, the arrangement of a drive unit 111 is different from that of the drive unit 11 of Specific Example 1 of the embodiment. The other arrangements are identical with those of Specific Example 1 of the embodiment.

Figure 8:
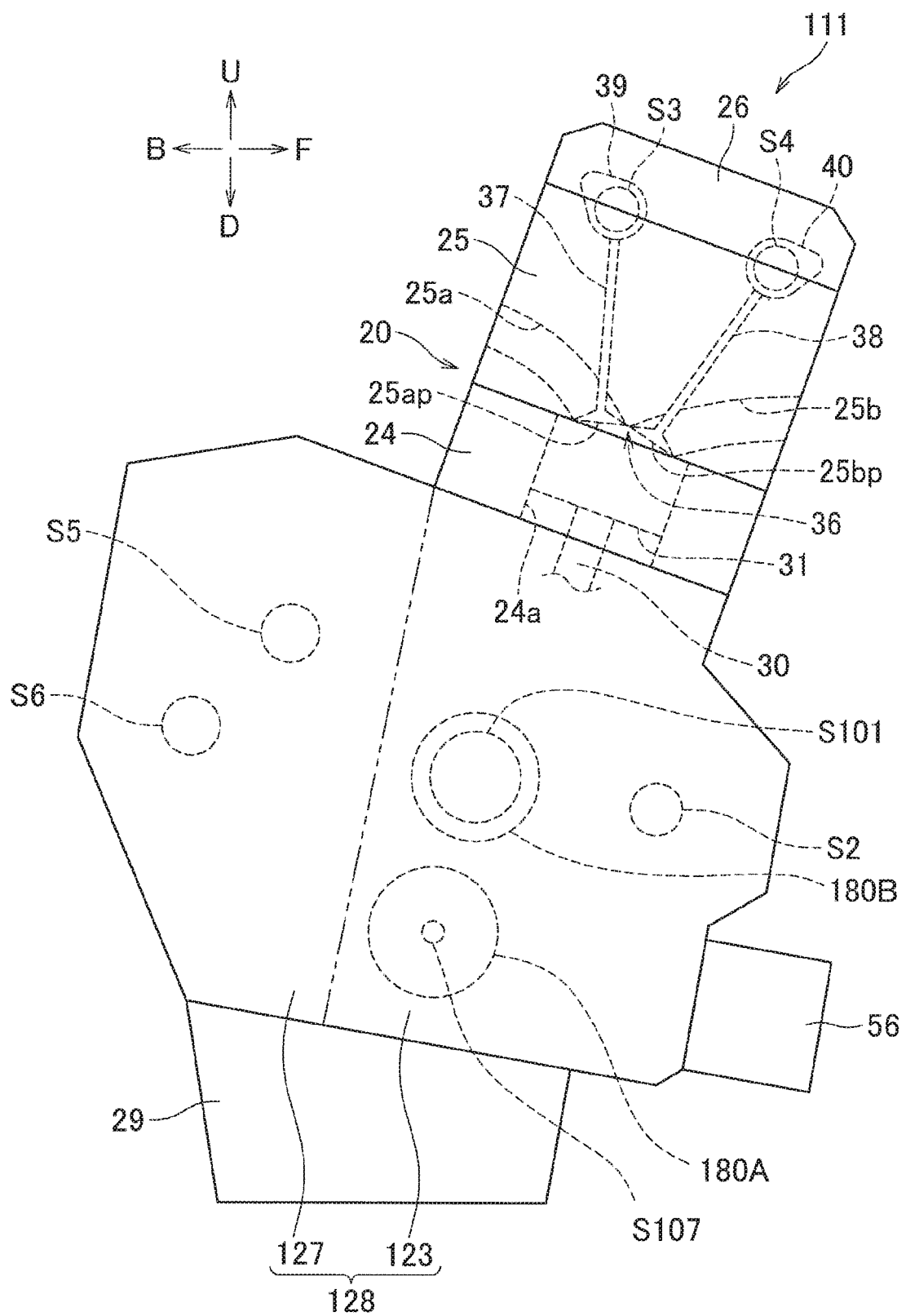
FIG. 8 is a right side view of a drive unit of Specific Example 2 of the embodiment.
Figure 9:
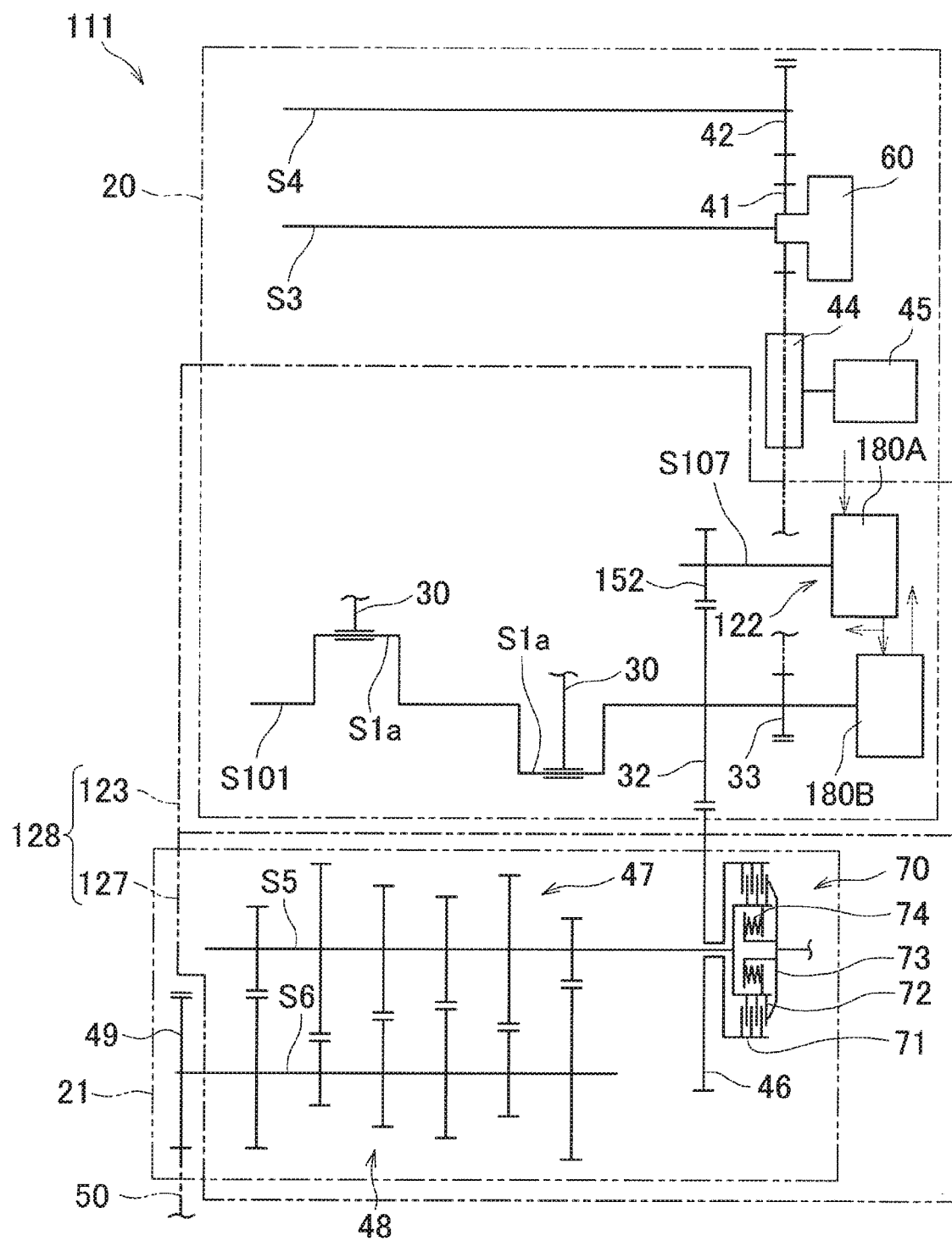
FIG. 9 shows an outline of a drive unit of Specific Example 2 of the embodiment.
Figure 10:
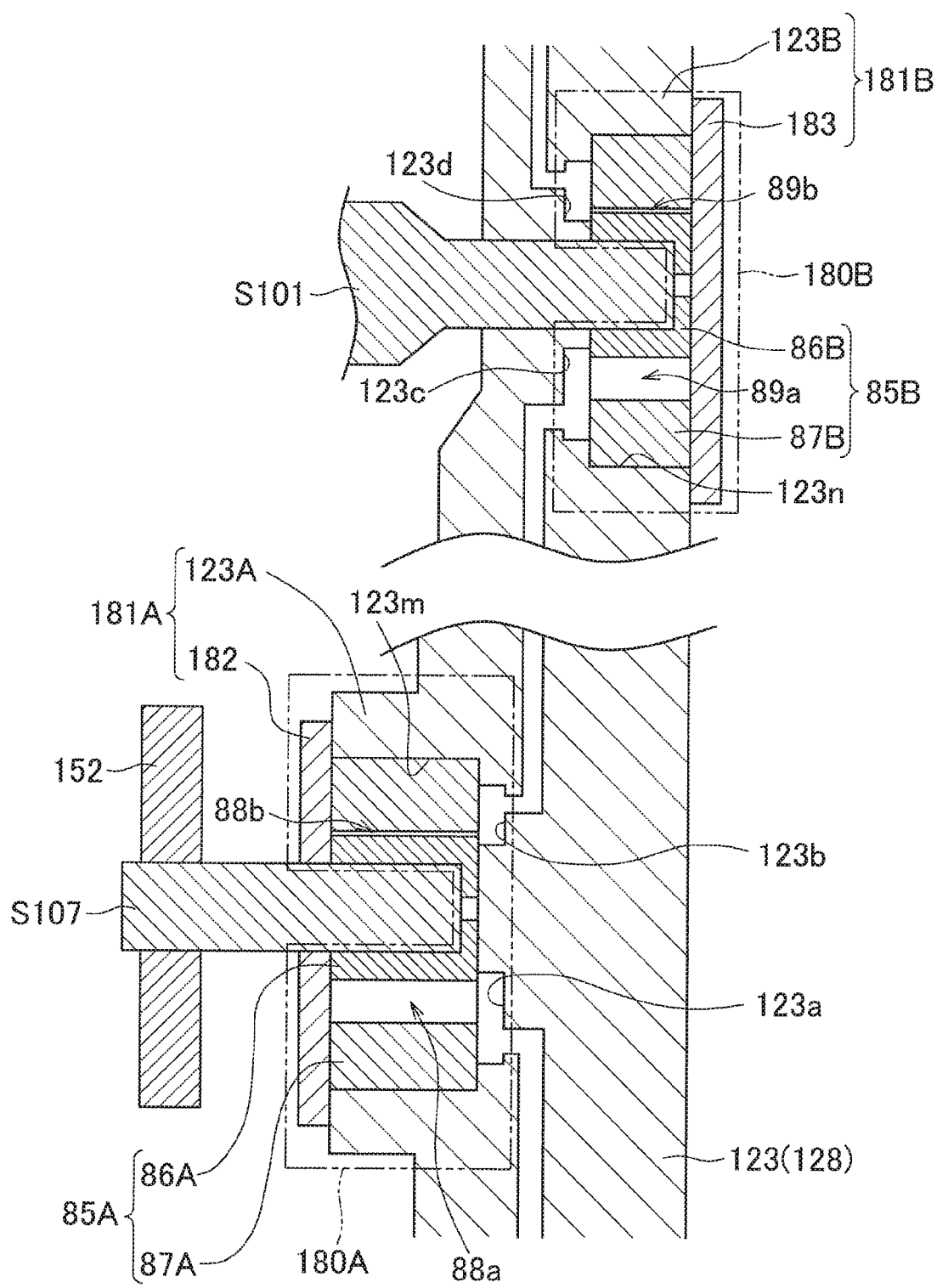
FIG. 10 is a schematic cross section of a first booster pump and a second booster pump of the drive unit of Specific Example 2 of the embodiment.

As shown in FIG. 8 and FIG. 9, the drive unit 111 of Specific Example 2 of the embodiment includes a drive unit case 128. The drive unit case 128 includes a crankcase member 123 and a transmission case member 127. The border between the crankcase member 123 and the transmission case member 127, which is indicated by a two-dot chain line in FIG. 8, may be identical to or different from the border in Specific Example 1 of the embodiment. The drive unit 111 includes an engine main body unit 20, a transmission unit 21, and a shared lubrication oil supply mechanism 122 (see FIG. 9). The balance shaft S2 is omitted from FIG. 9.

The drive unit 111 does not include the oil pump shaft S7 and the pump device 80 of Specific Example 1 of the embodiment. The drive unit 111 includes an oil pump shaft S107, a first booster pump 180A, and a second booster pump 180B.

The oil pump shaft S107 is housed in the crankcase member 123. As shown in FIG. 9 and FIG. 10, a pump gear 152 (pump rotational body) is provided on the oil pump shaft S107. The pump gear 152 rotates together with the oil pump shaft S107. The pump gear 152 is engaged with the drive gear 32 of the crankshaft S101. The oil pump shaft S107 is rotationally driven by the crankshaft S101.

The first booster pump 180A is provided on the oil pump shaft S107. The first booster pump 180A is driven by the rotational force of the oil pump shaft S107. As shown in FIG. 10, the first booster pump 180A is constituted by a first booster pump main body 85A and a first housing 181A in which the first booster pump main body 85A is housed. The first housing 181A is constituted by a housing portion 123A and a cover 182. The housing portion 123A is a part of the crankcase member 123. In other words, the housing portion 123A is a part of the drive unit case 128. A circular recess 123m is formed in a face of the housing portion 123A, the face opposing the cover 182. This recess 123m is formed in the inner surface of the crankcase member 123. The first booster pump main body 85A is provided in this recess 123m.

The housing portion 123A includes a first suction passage 123a and a first discharge passage 123b. One end of the first suction passage 123a is connected to the first suction pump chamber 88a of the first booster pump main body 85A. One end of the first discharge passage 123b is connected to the first discharge pump chamber 88b of the first booster pump main body 85A.

The second booster pump 180B is provided at an end portion of the crankshaft S101. The second booster pump 180B is driven by the rotational force of the crankshaft S101. The second booster pump 180B is constituted by a second booster pump main body 85B and a second housing 181B in which the second booster pump main body 85B is housed. The second housing 181B includes a housing portion 123B and a cover 183. The housing portion 123B is a part of the crankcase member 123. In other words, housing portion 123B is a part of the drive unit case 128. A circular recess 123n is formed in a face of the housing portion 123B, the face opposing the cover 183. This recess 123n is formed in the outer surface of the crankcase member 123. The second booster pump main body 85B is provided in this recess 123n.

The housing portion 123B includes a second suction passage 123c and a second discharge passage 123d. One end of the second suction passage 123c is connected to the second suction pump chamber 89a of the second booster pump main body 85B. One end of the second discharge passage 123d is connected to the second discharge pump chamber 89b of the second booster pump main body 85B.

Though not illustrated, paths of the shared lubrication oil in the shared lubrication oil supply mechanism 122 of Specific Example 2 of the embodiment are substantially identical to those of Specific Example 1 of the embodiment. High-pressure shared lubrication oil obtained by pressurizing, by the second booster pump main body 85B, part of the shared lubrication oil which has been pressurized by the first booster pump main body 85A is supplied to a variable valve timing device 60. FIG. 9 schematically shows, by dotted arrows, the flow of the shared lubrication oil to and from the first booster pump 180A and the second booster pump 180B.

In Specific Example 2 of the embodiment, the first oil passage member 90 (see FIG. 5) is formed entirely in the crankcase member 123. The second oil passage member 91 (see FIG. 5) connects the first discharge passage 123b of the first booster pump 180A to the second suction passage 123c of the second booster pump 180B. At least a part of the second oil passage member 91 is formed in the drive unit case 128. To be more specific, at least a part of the second oil passage member 91 is formed in the crankcase member 123. The second oil passage member 91 may be entirely formed in the drive unit case 128. The first discharge passage 123b, a passage in the second oil passage member 91, and the second suction passage 123c are equivalent to the low-pressure communication passage of the present teaching.

The second discharge passage 123d of the second booster pump 180B is connected to the fifth oil passage member 94 (see FIG. 5). At least a part of the fifth oil passage member 94 is formed in the crankcase member 123. In other words, in Specific Example 2 of the embodiment, at least a part of the fifth oil passage member 94 is formed in the drive unit case 128. The fifth oil passage member 94 is a passage member in which high-pressure shared lubrication oil obtained by pressurizing, by the second booster pump 180B, at least part of the shared lubrication oil which has been pressurized by the first booster pump 180A and is in a positive pressure condition flows. The fifth oil passage member 94 is equivalent to the high-pressure oil passage member of the present teaching.

With regard to the arrangement identical to Specific Example 1 of the embodiment, the drive unit 111 of Specific Example 2 of the embodiment exerts the same effect as Specific Example 1 of the embodiment. In addition to this, the drive unit 111 of Specific Example 2 of the embodiment exerts the following effects.

The first booster pump 180A and the second booster pump 180B are driven by mutually different rotational shafts (S107 and S101). It is therefore possible to provide the first booster pump 180A and the second booster pump 180B to be remote from each other. The degree of freedom in the layout of the booster pumps can be increased. As a result, the increase in size of the drive unit 111 can be further restrained while the booster pump functions are enhanced.

The drive unit case 128 is also a part of the first housing 181A of the first booster pump 180A and a part of the second housing 181B of the second booster pump 180B. This makes it possible to further downsize the space required for providing the booster pump. As a result, the increase in size of the drive unit 111 can be further restrained while the booster pump functions are enhanced.

Specific Example 3 of Embodiment of Present Teaching

Specific Example 3 of the above-described embodiment of the present teaching will be described with reference to FIG. 11 and FIG. 12. Components having the same structure as those in Specific Example 1 will be given the same reference numerals, and the description thereof will be omitted, if appropriate. In a motorcycle of Specific Example 3 of the embodiment, the arrangement of a drive unit 211 is different from that of the drive unit 11 of Specific Example 1 of the embodiment. The other arrangements are identical to those of Specific Example 1 of the embodiment.

Figure 11:
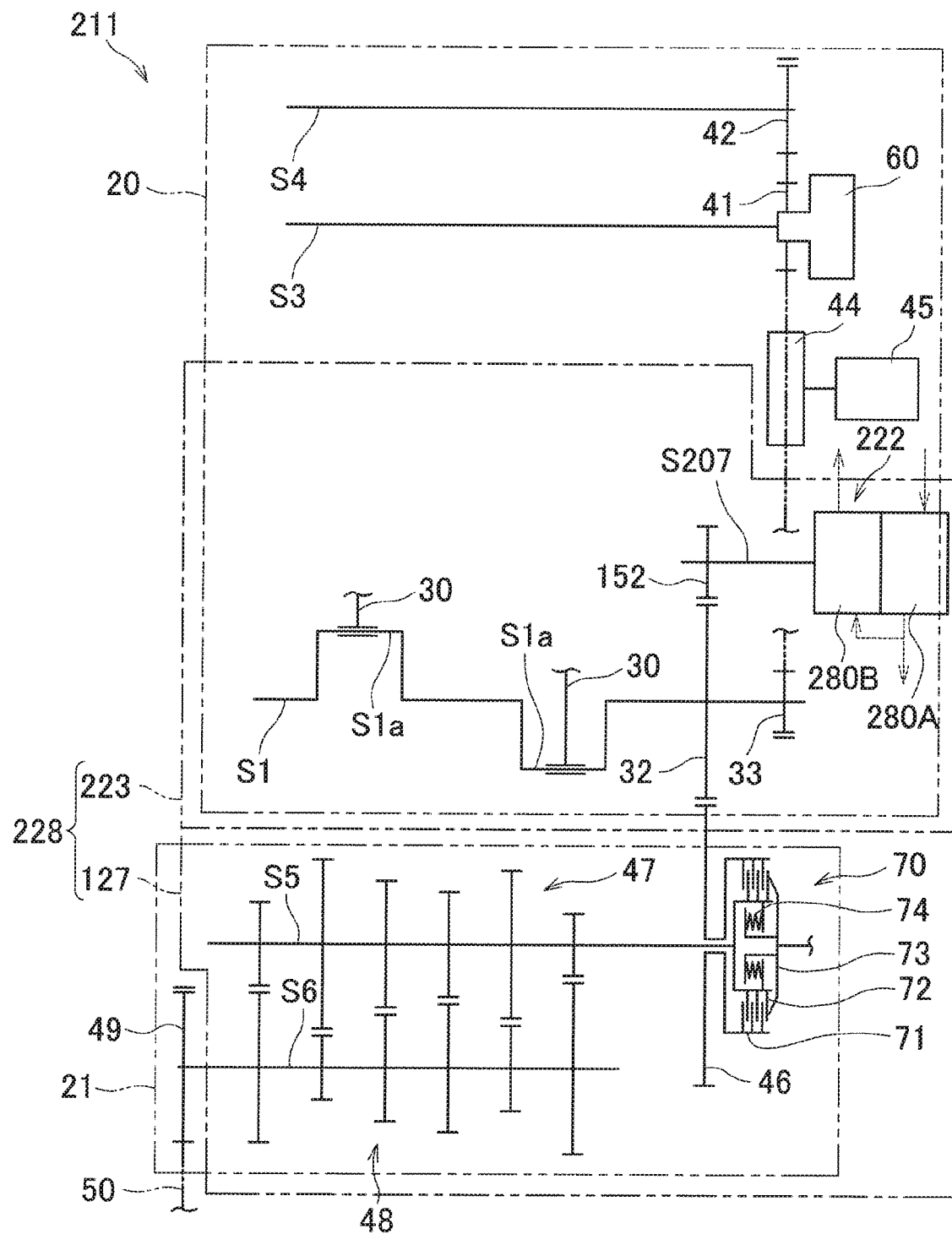
FIG. 11 shows an outline of a drive unit of Specific Example 3 of the embodiment.
Figure 12:
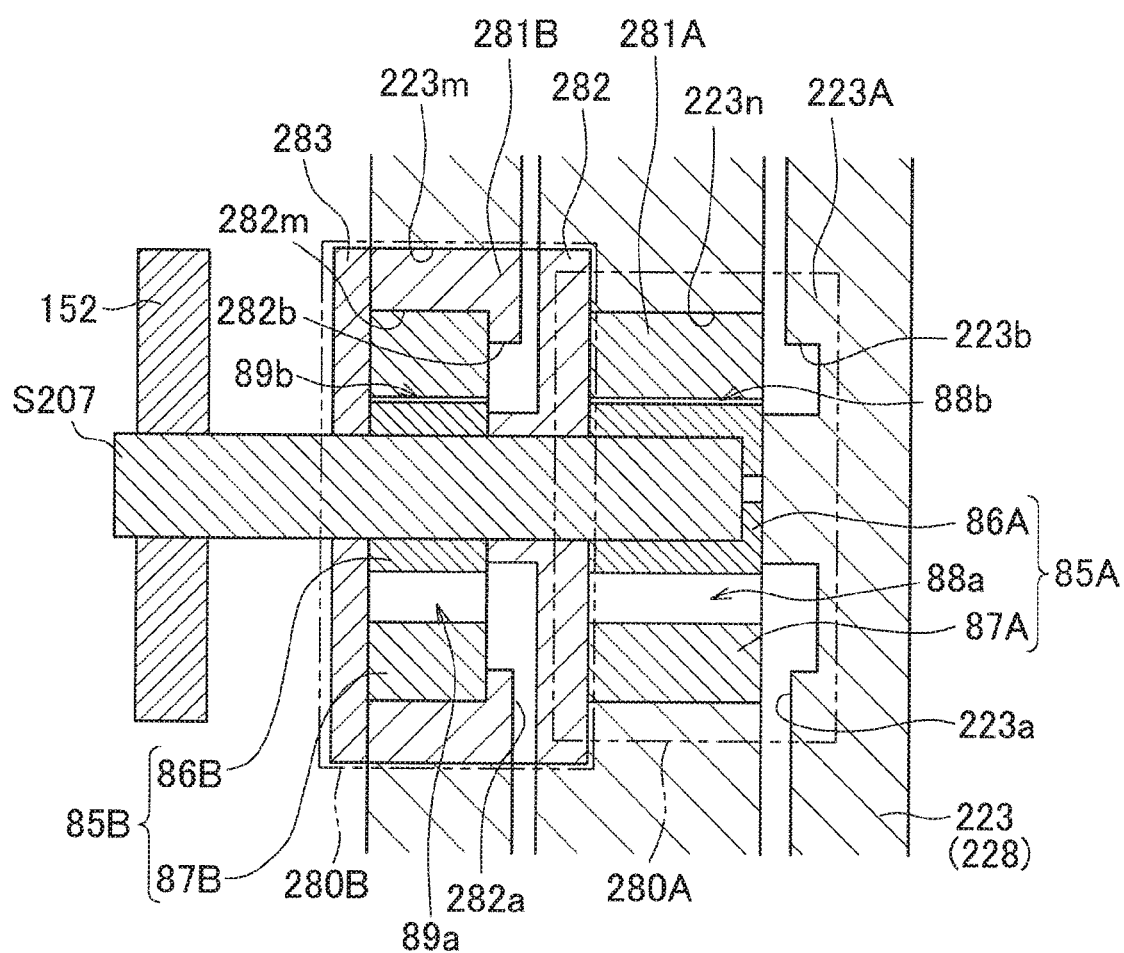
FIG. 12 is a schematic cross section of a first booster pump and a second booster pump of the drive unit of Specific Example of the embodiment.

As shown in FIG. 11, the drive unit 211 of Specific Example 3 of the embodiment includes a drive unit case 228. The drive unit case 228 includes a crankcase member 223 and a transmission case member 127. The border between the crankcase member 223 and the transmission case member 127 may be identical to or different from the border in Specific Example 1 of the embodiment. The drive unit 211 includes an engine main body unit 20, a transmission unit 21, and a shared lubrication oil supply mechanism 222. The balance shaft S2 is omitted from FIG. 11.

The drive unit 211 does not include the oil pump shaft S7 and the pump device 80 of Specific Example 1 of the embodiment. The drive unit 211 includes an oil pump shaft S207, a first booster pump 280A, and a second booster pump 280B.

The oil pump shaft S207 is provided at the same position as the oil pump shaft S107 of Specific Example 2 of the embodiment. The oil pump shaft S207 is longer than the oil pump shaft S107 in the direction in parallel to the rotational axis. In the same manner as in the oil pump shaft S107, a pump gear 152 engaged with a drive gear 46 is provided on the oil pump shaft S207.

The first booster pump 280A and the second booster pump 280B are provided on the oil pump shaft S207. The first booster pump 280A and the second booster pump 280B are driven by the rotational force of the oil pump shaft S207. As shown in FIG. 12, the first booster pump 280A is constituted by a first booster pump main body 85A and a first housing 281A in which the first booster pump main body 85A is housed. The first housing 281A is constituted by a housing portion 223A and a housing member 282. The second booster pump 280B is constituted by a second booster pump main body 85B and a second housing 281B in which the second booster pump main body 85B is housed. The second housing 281B is constituted by the housing member 282 and a cover 283. A part of the first housing 281A is also a part of the second housing 281B. The housing portion 223A of the first booster pump 280A is a part of the crankcase member 223.

A circular recess 223m is formed in the inner surface of the crankcase member 223. A circular recess 223n which is smaller than the recess 223m is formed at a bottom portion of the recess 223m. A circumferential part of the recess 223n constitutes the housing portion 223A. The first booster pump main body 85A is provided in the recess 223n. The housing member 282 and the second booster pump main body 85B are provided in the recess 223m. A circular recess 282m is formed in a surface of the housing member 282, the surface opposing cover 283. The second booster pump main body 85B is provided in this recess 282*m*.

The housing portion 223A includes a first suction passage 223*a* and a first discharge passage 223*b*. One end of the first suction passage 223*a* is connected to the first suction pump chamber 88*a* of the first booster pump main body 85A. One end of the first discharge passage 223*b* is connected to the first discharge pump chamber 88*b* of the first booster pump main body 85A. The housing member 282 includes a second suction passage 282*a* and a second discharge passage 282*b*. One end of the second suction passage 282*a* is connected to the second suction pump chamber 89*a* of the second booster pump main body 85B. One end of the second discharge passage 282*b* is connected to the second discharge pump chamber 89*b* of the second booster pump main body 85B.

Though not illustrated, paths of the shared lubrication oil in the shared lubrication oil supply mechanism 222 of Specific Example 3 of the embodiment are substantially identical to those of Specific Example 1 of the embodiment. High-pressure shared lubrication oil obtained by pressurizing, by the second booster pump main body 85B, part of the shared lubrication oil which has been pressurized by the first booster pump main body 85A is supplied to a variable valve timing device 60. FIG. 11 schematically shows, by dotted arrows, the flow of the shared lubrication oil to and from the first booster pump 280A and the second booster pump 280B.

In Specific Example 3 of the embodiment, the first oil passage member 90 (see FIG. 5) is formed entirely in the crankcase member 223. The second oil passage member 91 (see FIG. 5) connects the first discharge passage 223*b* of the first booster pump 280A to the second suction passage 282*a* of the second booster pump 280B. At least a part of the second oil passage member 91 is formed in the drive unit case 228. To be more specific, at least a part of the second oil passage member 91 is formed in the crankcase member 223. The second oil passage member 91 may be entirely formed in the drive unit case 228. The first discharge passage 223*b*, a passage in the second oil passage member 91, and the second suction passage 282*a* are equivalent to the low-pressure communication passage of the present teaching.

The second discharge passage 282*b* of the second booster pump 280B is connected to the fifth oil passage member 94. At least a part of the fifth oil passage member 94 (see FIG. 5) is formed in the crankcase member 223. In other words, in Specific Example 3 of the embodiment, at least a part of the fifth oil passage member 94 is formed in the drive unit case 228. The fifth oil passage member 94 is a passage member in which high-pressure shared lubrication oil obtained by pressurizing, by the second booster pump 280B, at least part of the shared lubrication oil which has been pressurized by the first booster pump 280A and is in a positive pressure condition flows. The fifth oil passage member 94 is equivalent to the high-pressure oil passage member of the present teaching.

With regard to the arrangement identical with Specific Example 1 of the embodiment, the drive unit of Specific Example 3 of the embodiment exerts the same effect as Specific Example 1. In addition to this, the drive unit of Specific Example 3 of the embodiment exerts the following effects.

The drive unit case 228 is also a part of the first housing 281A of the first booster pump 280A. This makes it possible to further downsize the space required for providing the booster pump. As a result, the increase in size of the drive unit 211 can be further restrained while the booster pump functions are enhanced.

Preferred embodiments of the present teaching have been described above. However, the present teaching is not limited to the above-described embodiments, and various changes can be made within the scope of the claims. Further, modifications described below may be used in combination as needed.

In Specific Examples 1 to 3 of the embodiment, the first booster pump main body 85A and the second booster pump main body 85B are different in length in the direction in parallel to the rotational axis but are identical in cross sectional shape. In this regard, the first booster pump main body 85A and the second booster pump main body 85B may be different in cross sectional shape.

In Specific Examples 1 to 3 of the embodiment, the first booster pump main body 85A has four inner teeth 87Aa and five outer teeth 86Aa. The same applies to the second booster pump main body 85B. In this connection, when the first booster pump is a trochoid pump, the number of inner teeth and the number of outer teeth of the first booster pump may be different from the above. However, the number of inner teeth must be smaller than the number of outer teeth.

In Specific Example 1 of the embodiment, the shared lubrication oil having been pressurized by the first booster pump 80A is discharged from the pump device 80 and then part of the oil returns to the pump device 80. This part is further pressurized by the second booster pump 80B. In this regard, at least part of the shared lubrication oil having been pressurized by the first booster pump 80A may be directly supplied to the second booster pump 80B. In other words, a passage for supplying at least part of the shared lubrication oil discharged from the first discharge pump chamber 88*b* of the first booster pump 80A to the second suction pump chamber 89*a* of the second booster pump 80B may be entirely formed in the housing member 83. This makes it possible to further decrease the total size of the two booster pumps. In Specific Example 3 of the embodiment, similarly, a passage for supplying at least part of the shared lubrication oil discharged from the first discharge pump chamber 88*b* of the first booster pump 280A to the second suction pump chamber 89*a* of the second booster pump 280B may be entirely formed in the housing member 282 and the housing portion 223A.

In Specific Examples 1 to 3 of the embodiment, the first relief valve 54A and the first booster pump are separate members. Alternatively, the first relief valve 54A may be provided in the housing of the first booster pump. Similarly, the second relief valve 54B may be provided in the housing of the second booster pump.

In Specific Examples 1 to 3 of the embodiment, the first relief valve 54A is opened and closed by a difference between the pressure on the discharging side and the pressure on the suction side of the first booster pump. In this regard, the first relief valve 54A may be configured to be opened when the pressure on the discharging side of the first booster pump is equal to or higher than a predetermined pressure, instead of being configured to be opened and closed by the pressure difference. In other words, the pressure introduction passage member 95*b* may not be provided. The same applies to the second relief valve 54B.

The oil pump shaft S7 of Specific Example 1 of the embodiment is driven by using the chain 53 and the sprockets 51 and 52. The oil pump shafts S107 and S207 of Specific Examples 2 and 3 of the embodiment are driven by using the gears 32 and 152. The oil pump shaft which drives the booster pump may be driven by using a gear. The oil pump shaft which drives the booster pump may be driven by using a chain and a sprocket. The oil pump shaft which drives the booster pump may be driven by using a belt and a pulley.

In Specific Example 1 of the embodiment, the first booster pump 80A and the second booster pump 80B are provided on the oil pump shaft S7 which is rotated by the rotational force of the input shaft S5. Alternatively, at least one of the first booster pump 80A or the second booster pump 80B may be provided on the input shaft S5.

In Specific Example 2 of the embodiment, only the second booster pump 180B is provided on the crankshaft S101. Alternatively, both of the first booster pump 180A and the second booster pump 180B may be provided on the crankshaft S101. Alternatively, the first booster pump 180A may be provided on the crankshaft S101 whereas the second booster pump 180B may be provided on another rotational shaft. The booster pump provided on the crankshaft is housed in the drive unit case.

Figure 13:
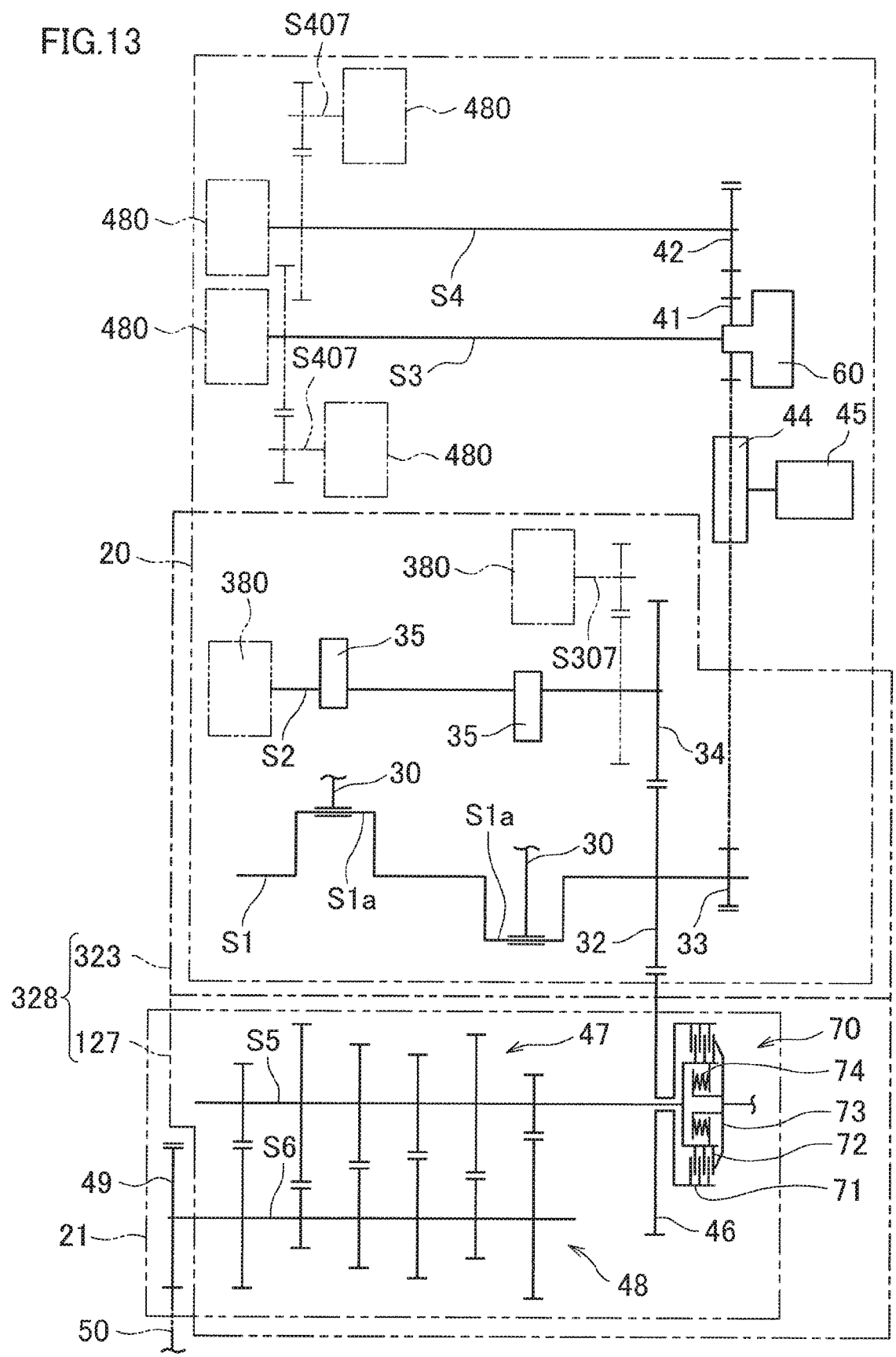
FIG. 13 shows the structure of a drive unit of a modification.

At least one of the first booster pump or the second booster pump may be driven by the rotational force of the balance shaft S2. In FIG. 13, a booster pump 380 indicated by two-dot chain lines is an example of a booster pump driven by the balance shaft S2. The booster pump 380 may be a first booster pump or a second booster pump. The booster pump 380 may be provided on the balance shaft S2. The booster pump 380 may be provided on an oil pump shaft S307 which is rotationally driven by the balance shaft S2. When both of the first booster pump and the second booster pump are rotationally driven by the balance shaft S2, these two booster pumps may or may not be provided on the same shaft. When one of the first booster pump and the second booster pump is driven by the rotational force of the balance shaft S2, the other one of the booster pumps may be driven by the rotational force of the crankshaft S1 or the input shaft S5. A drive unit case 328 houses the booster pump 380 which is driven by the rotational force of the balance shaft S2. A crankcase member 323 of the drive unit case 328 houses at least a part of the booster pump 380 which is driven by the rotational force of the balance shaft S2. A transmission case member 127 of the drive unit case 328 may house at least a part of the booster pump 380 which is driven by the rotational force of the balance shaft S2.

The input shaft S5 and the output shaft S6 of the transmission unit 21 do not always rotate when the crankshaft S1 rotates. Meanwhile, the balance shaft S2 is driven by the crankshaft S1 whenever the crankshaft S1 rotates. On this account, the discharge pressure of the shared lubrication oil can be stably secured when at least one of the first booster pump or the second booster pump is driven by the balance shaft S2. This makes it possible to further enhance the booster pump functions. Furthermore, a space where a booster pump is provided is easily found around the balance shaft S2, as compared to the vicinity of the crankshaft S1. As a result, the increase in size of the drive unit can be further restrained while the booster pump functions are enhanced.

At least one of the first booster pump or the second booster pump may be driven by the rotational force of the intake cam shaft S3 or the exhaust cam shaft S4. In FIG. 13, a booster pump 480 indicated by two-dot chain lines is an example of a booster pump driven by the intake cam shaft S3 or the exhaust cam shaft S4. The booster pump 480 may be a first booster pump or a second booster pump. The booster pump 480 may be provided on the intake cam shaft S3 or the exhaust cam shaft S4. The booster pump 480 may be provided on the oil pump shaft S407 which is rotationally driven by the intake cam shaft S3 or the exhaust cam shaft S4. When both of the first booster pump and the second booster pump are rotationally driven by one cam shaft (S3 or S4), these two booster pumps may or may not be provided on the same shaft. The first booster pump and the second booster pump may be rotationally driven by mutually different cam shafts. When one of the first booster pump and the second booster pump is driven by the rotational force of the intake cam shaft S3 or the exhaust cam shaft S4, the other one of the booster pumps may be driven by the rotational force of the crankshaft S1, the input shaft S5, or the balance shaft S2. The booster pump 480 driven by the rotational force of the intake cam shaft S3 or the exhaust cam shaft S4 is provided inside the cylinder head 25 (see FIG. 2) or the head cover 26 (see FIG. 2). The drive unit case 328 may not house the booster pump 480 which is driven by the rotational force of the intake cam shaft S3 or the exhaust cam shaft S4. The drive unit case 328 may house the booster pump 480 which is driven by the rotational force of the intake cam shaft S3 or the exhaust cam shaft S4.

The input shaft S5 and the output shaft S6 of the transmission unit 21 do not always rotate when the crankshaft S1 rotates. Meanwhile, the cam shafts S3 and S4 are driven by the crankshaft S1 whenever the crankshaft S1 rotates. On this account, the discharge pressure of the shared lubrication oil can be stably secured when at least one of the first booster pump or the second booster pump is driven by the intake cam shaft S3 or the exhaust cam shaft S4. This makes it possible to further enhance the booster pump functions.

Furthermore, a space where a booster pump is provided is easily found around the cam shafts S3 and S4, as compared to the vicinity of the crankshaft S1. As a result, the increase in size of the drive unit can be further restrained while the booster pump functions are enhanced.

The drive unit for the straddled vehicle of the present teaching may include an additional rotational shaft which is different from the rotational shafts S1 to S7, S101, S107, and S207 which have been described in Specific Examples 1 to 3 of the embodiment. At least one of the first booster pump or the second booster pump may be driven by this rotational shaft.

In Specific Example 2 and Specific Example 3 of the embodiment, the suction passages 123a, 123c, and 223a and the discharge passages 123b, 123d, and 223b of the booster pumps 180A, 180B, and 280A are formed in the drive unit cases 128 and 228. In this regard, the suction passage and the discharge passage of the booster pump may be formed in the cylinder body 24, the cylinder head 25, or the head cover 26. In other words, at least a part of the housing of the booster pump may be a part of the cylinder body 24, the cylinder head 25, or the head cover 26.

Figure 14:
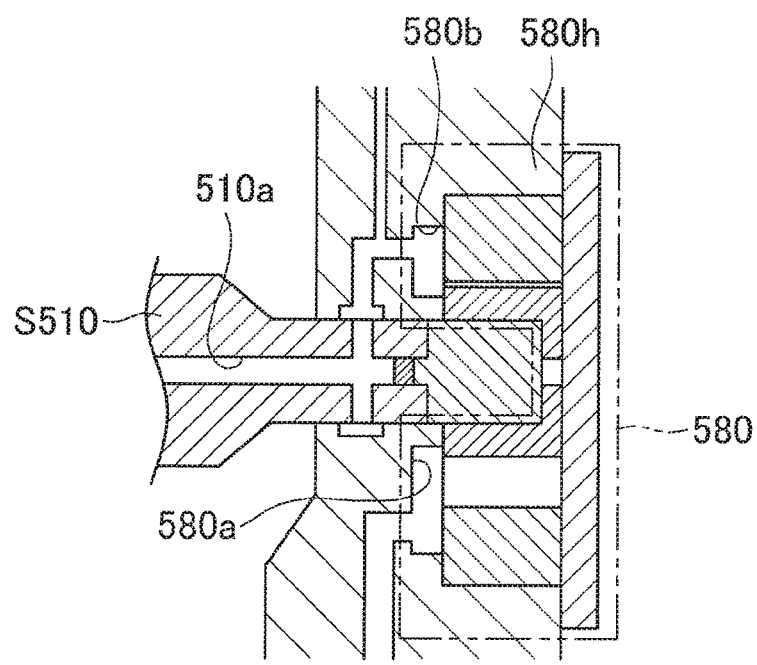
FIG. 14 is a schematic cross section of a booster pump of another modification.

For example, as shown in FIG. 14, a passage 580b formed in a housing 580h of a booster pump 580 may communicate with an oil passage 510a which is formed inside a rotational shaft S510 on which the booster pump 580 is provided. In FIG. 14, the passage 580b communicating with the oil passage 510a is a discharge passage connected to a discharge pump chamber of the booster pump 580. The oil passage formed inside the rotational shaft on which the booster pump is provided may communicate with the suction passage of the booster pump.

The engine main body unit 20 is a so-called DOHC (Double Over Head Camshaft) engine which drives the intake valve 37 and the exhaust valve 38 by the two cam shafts S3 and S4. Furthermore, the engine main body unit 20 is a direct-strike type DOHC engine not having a rocker arm. The type of the valve operating mechanism of the engine main body unit of the drive unit for the straddled vehicle of the present teaching is not limited to this type.

The engine main body unit 20 may be a swing-arm type DOHC engine shown in FIG. 15B, for example. The swing-arm type DOHC engine includes swing-arm type rocker arms 703 and 704 which are provided between cams 39 and 40 and valves 737 and 738.

The engine main body unit 20 may be a seesaw type DOHC engine.

The engine main body unit 20 may be a seesaw type SOHC (Single Over Head Camshaft) engine shown in FIG. 15C, for example. The SOHC engine drives an intake valve 837 and an exhaust valve 838 by a single cam shaft S803. Seesaw type rocker arms 803 and 804 are provided between cams 839 and 840 and valves 837 and 838.

The engine main body unit 20 may be a swing-arm type SOHC engine.

The engine main body unit 20 may be an OHV (Over Head Valve) engine. The OHV engine includes a seesaw type rocker arm. The rocker arm is pushed up by a push rod to press a valve. The push rod is driven by a cam shaft.

While the variable valve timing device 60 is provided only on the intake cam shaft S3, a variable valve timing device may be provided on the exhaust cam shaft S4. This variable valve timing device is preferably operated by the shared lubrication oil which has been pressurized by both the first booster pump 80A and the second booster pump 80B.

The specific arrangement of the variable valve timing device 60 is not limited to the structure described in Specific Example 1 of the embodiment. The variable valve timing device 60 may be differently arranged on condition that the device is driven by hydraulic pressure. The variable valve timing device 60 may be arranged such that not only timings to open and close the valve are changed but also the opening angle of the valve is changed. The opening angle of the valve is, in other words, the working angle of the cam.

The paths of the shared lubrication oil are not limited to those shown in FIG. 5. A supply target of the shared lubrication oil having been pressurized by both the first booster pump 80A and the second booster pump 80B is not limited to the variable valve timing device 60. A part of the shared lubrication oil having been pressurized by both two booster pumps may be used to lubricate a slide portion of the engine main body unit or the transmission unit. A supply target of the shared lubrication oil having been pressurized by both two booster pumps is preferably a hydraulically-actuated device. For example, a hydraulically-actuated device operated by the shared lubrication oil having been pressurized by both two booster pumps may be the tensioner device 45.

Alternatively, a hydraulically-actuated device operated by the shared lubrication oil having been pressurized by both two booster pumps may be a lash adjuster (also known as a hydraulic tappet). The following will describe a case where the lash adjuster is provided.

For example, as shown in FIG. 15A, lash adjusters 601 and 602 may be provided between valves 637 and 638 and cams 39 and 40. Publicly-known lash adjusters are used as the lash adjusters 601 and 602. The lash adjusters 601 and 602 are arranged to always be in contact with the valves 637 and 638 and the cams 39 and 40. On this account, the gaps between the valves 637 and 638 and the cams 39 and 40 are maintained to be substantially zero. In this modification, the cams 39 and 40 are equivalent to a pressing member pressing a valve in an opening direction in the present teaching.

For example, as shown in FIG. 15B, when the engine main body unit 20 is a swingarm type DOHC engine, lash adjusters 701 and 702 may be provided. Each of the lash adjusters 701 and 702 is fixed to a wall inside the cylinder head. One ends of rocker arms 703 and 704 are in contact with valves 737 and 738 whereas the other ends are in contact with the lash adjusters 701 and 702. The lash adjusters 701 and 702 bias the rocker arms 703 and 704 in the direction of pushing up the arms, so that the valves 737 and 738 are always in contact with the rocker arms 703 and 704. In this modification, the rocker arms 703 and 704 are equivalent to the pressing member pressing a valve in an opening direction in the present teaching.

For example, as shown in FIG. 15C, when the engine main body unit 20 is a seesaw type SOHC engine, lash adjusters 801 and 802 may be provided. The lash adjusters 801 and 802 are provided between valves 837 and 838 and rocker arms 803 and 804. The lash adjusters 801 and 802 are arranged to always be in contact with the valves 837 and 838 and the rocker arms 803 and 804. In this modification, the rocker arms 803 and 804 are equivalent to the pressing member pressing a valve in an opening direction in the present teaching.

In addition to the above, when the engine main body unit 20 is an OHV engine, a lash adjuster may be provided. Being similar to the lash adjusters 801 and 802 shown in FIG. 15C, the lash adjuster is arranged to always be in contact with the valve and the rocker arm. In this modification, the rocker arm is equivalent to the pressing member pressing a valve in an opening direction in the present teaching.

For example, as shown in FIG. 15C, only one cam shaft is provided when the engine main body unit 20 is an SOHC engine. At least one of the first booster pump or the second booster pump may be driven by the one cam shaft.

The drive unit for the straddled vehicle of the present teaching may include three or more booster pumps. At least part of the shared lubrication oil having been pressurized by both the first booster pump and the second booster pump may be further pressurized by a third booster pump. In this case, a hydraulically-actuated device in the engine main body unit or the transmission unit is operated by the shared lubrication oil having been pressurized by the three or more booster pumps. Furthermore, in the direction in which the oil flows, an oil tank is provided between the booster pump which is closest to the oil pan 29 and the first booster pump which is second closest to the oil pan 29.

In Specific Examples 1 to 3 of the embodiment, the crankshaft S1, S101 is entirely housed in the crankcase member 23. Alternatively, at least a part of the crankshaft S1, S101 may be housed in the crankcase member 23. For example, one end portion of the crankshaft S1, S101 may protrude from the crankcase member 23.

In Specific Examples 1 to 3 of the embodiment, the balance shaft S2 is entirely housed in the crankcase member 23. Alternatively, at least a part of the balance shaft S2 may be housed in the crankcase member 23 or the transmission case member 27.

The drive unit may include one or more balance shafts in addition to the balance shaft S2. These balance shafts are housed in the drive unit case 28, 128, 228. At least a part of each balance shaft may be housed in the crankcase member 23, 123, 223 or the transmission case member 27. The balance shafts are rotationally driven by the crankshaft.

In Specific Examples 1 to 3 of the embodiment above, the drive unit case 28 and the cylinder body 24 are separate members. Alternatively, the drive unit case and the cylinder body may be integrally formed. In Specific Examples 1 to 3 of the embodiment above, the cylinder body 24, the cylinder head 25, and the head cover 26 are separate members.

Alternatively, two or three of the cylinder body, the cylinder head, and the head cover may be integrally formed. In Specific Examples 1 to 3 of the embodiment above, the drive unit case 28 and the oil pan 29 are separate members. Alternatively, the crankcase and the oil pan may be integrally formed.

REFERENCE SIGNS LIST

1 motorcycle (straddled vehicle)
4 vehicle body frame
9 seat
11, 111, 211 drive unit
20 engine main body unit
21 transmission unit
22, 122, 222 shared lubrication oil supply mechanism
23, 123, 223, 323 crankcase member
25a intake passage (gas passage)
25b exhaust passage (gas passage)
27, 127 transmission case member
28, 128, 228, 328 drive unit case
32 drive gear
33 crank sprocket (crank rotational body)
36 combustion chamber
37, 637, 737, 837 intake valve
38, 638, 738, 838 exhaust valve
39, 839 intake cam (pressing member)
40, 840 exhaust cam (pressing member)
41 intake cam sprocket (cam rotational body)
42 exhaust cam sprocket (cam rotational body)
43 cam chain (winding member)
46 driven gear
45 tensioner device
60 variable valve timing device
80 pump device
80A, 180A, 280A first booster pump
80B, 180B, 280B second booster pump
85A first booster pump main body
85B second booster pump main body
81A, 181A, 281A first housing
81B, 181B, 281B second housing
82, 83, 282 housing member
83a, 123a, 223a first suction passage
83b, 123b, 223b first discharge passage (low-pressure communication passage)
83c, 123c, 282a second suction passage (low-pressure communication passage)
83d, 123d, 282b second discharge passage
84, 182, 183, 283 cover
88, 89 pump chamber
88a first suction pump chamber
88b first discharge pump chamber
89a second suction pump chamber
89b second discharge pump chamber
91 second oil passage member (low-pressure communication passage)
94 fifth oil passage member (high-pressure oil passage member)
123A, 123B, 223A housing portion
380, 480, 580 booster pump
580h housing
703, 704, 803, 804 rocker arm (pressing member)
601, 602, 701, 702, 801, 802 lash adjuster
S1, S101 crankshaft
S2 balance shaft
S3 intake cam shaft
S4 exhaust cam shaft
S5 input shaft
S6 output shaft
S7, S107, S207, S307, S407 oil pump shaft
S510 rotational shaft
S803 cam shaft

What is claimed is:

1. A drive unit for a straddled vehicle, the drive unit including a vehicle body frame, a seat supported by the vehicle body frame, and the drive unit provided below an upper end of an upper surface of the seat in a vehicle up-down direction and supported by the vehicle body frame, the drive unit comprising:
   an engine main body unit including a crankshaft;
   a transmission unit including an input shaft rotationally driven by the crankshaft and an output shaft rotationally driven by the input shaft; and
   a shared lubrication oil supply mechanism including a first booster pump and a second booster pump,
   the first booster pump being configured to pressurize shared lubrication oil by which both the engine main body unit and the transmission unit are lubricated,
   the second booster pump being driven by rotational force of one of rotational shafts of the engine main body unit and the transmission unit and configured to pressurize a part of the shared lubrication oil which has been pressurized by the first booster pump and has a pressure higher than atmospheric pressure,
   the shared lubrication oil supply mechanism supplying high-pressure shared lubrication oil, which is obtained by pressurizing, by the second booster pump, the part of the shared lubrication oil having been pressurized by the first booster pump and having the pressure higher than atmospheric pressure, to at least one of the engine main body unit or the transmission unit,
   the shared lubrication oil supply mechanism being configured to supply part of the shared lubrication oil having been pressurized by the first booster pump and having the pressure higher than atmospheric pressure to at least one of the engine main body unit or the transmission unit, without further pressurizing the shared lubrication oil by the second booster pump.

2. The drive unit for the straddled vehicle according to claim 1, wherein
   the engine main body unit includes a crankcase member which houses at least a part of the crankshaft,
   the transmission unit includes a transmission case member which houses at least a part of the input shaft and at least a part of the output shaft and is at least partially integrally molded with at least a part of the crankcase member, and
   the drive unit includes a drive unit case which includes the crankcase member and the transmission case member and houses the first booster pump and the second booster pump.

3. The drive unit for the straddled vehicle according to claim 2,
   wherein at least a part of a high-pressure oil passage member is formed in the drive unit case, and
   wherein the high-pressure shared lubrication oil obtained by pressurizing, by the second booster pump, the part of the shared lubrication oil having been pressurized by the first booster pump and having the pressure higher than atmospheric pressure flows in the high-pressure oil passage member.

4. The drive unit for the straddled vehicle according to claim 3, wherein the first booster pump includes a first discharge pump chamber formed in the first booster pump and discharging the shared lubrication oil pressurized by the first booster pump, the second booster pump includes a second suction pump chamber formed in the second booster pump and sucking the part of the shared lubrication oil having been pressurized by the first booster pump and having pressure higher than atmospheric pressure, and the shared lubrication oil supply mechanism includes a low-pressure communication passage which allows the first discharge pump chamber to communicate with the second suction pump chamber, the low-pressure communication passage maintaining pressure of the shared lubrication oil having been pressurized by the first booster pump to have a pressure higher than atmospheric pressure.

5. The drive unit for the straddled vehicle according to claim 3, wherein the first booster pump is driven by the rotational force of the one of the rotational shafts of the engine main body unit and the transmission unit.

6. The drive unit for the straddled vehicle according to claim 3, wherein at least one of the engine main body unit or the transmission unit includes at least one hydraulically-actuated device which is operated by the high-pressure shared lubrication oil obtained by pressurizing, by the second booster pump, the part of the shared lubrication oil having been pressurized by the first booster pump and having the pressure higher than atmospheric pressure.

7. The drive unit for the straddled vehicle according to claim 2, wherein the first booster pump includes a first discharge pump chamber formed in the first booster pump and discharging the shared lubrication oil pressurized by the first booster pump, the second booster pump includes a second suction pump chamber formed in the second booster pump and sucking the part of the shared lubrication oil having been pressurized by the first booster pump and having pressure higher than atmospheric pressure, and the shared lubrication oil supply mechanism includes a low-pressure communication passage which allows the first discharge pump chamber to communicate with the second suction pump chamber, and the low-pressure communication passage maintaining pressure of the shared lubrication oil having been pressurized by the first booster pump to have a pressure higher than atmospheric pressure.

8. The drive unit for the straddled vehicle according to claim 2, wherein the first booster pump is driven by the rotational force the of one of the rotational shafts of the engine main body unit and the transmission unit.

9. The drive unit for the straddled vehicle according to claim 2, wherein at least one of the engine main body unit or the transmission unit includes at least one hydraulically-actuated device which is operated by the high-pressure shared lubrication oil obtained by pressurizing, by the second booster pump, the part of the shared lubrication oil having been pressurized by the first booster pump and having the pressure higher than atmospheric pressure.

10. The drive unit for the straddled vehicle according to claim 1, wherein the first booster pump includes a first discharge pump chamber formed in the first booster pump and discharging the shared lubrication oil pressurized by the first booster pump, the second booster pump includes a second suction pump chamber formed in the second booster pump and sucking the part of the shared lubrication oil having been pressurized by the first booster pump and having pressure higher than atmospheric pressure, and the shared lubrication oil supply mechanism includes a low-pressure communication passage which allows the first discharge pump chamber to communicate with the second suction pump chamber, the low-pressure communication passage maintaining pressure of the shared lubrication oil having been pressurized by the first booster pump to have a pressure higher than atmospheric pressure.

11. The drive unit for the straddled vehicle according to claim 10, wherein the first booster pump driven by the rotational force of the one of the rotational shafts of the engine main body unit and the transmission unit.

12. The drive unit for the straddled vehicle according to claim 10, wherein at least one of the engine main body unit or the transmission unit includes at least one hydraulically-actuated device which is operated by the high-pressure shared lubrication oil obtained by pressurizing, by the second booster pump, the part of the shared lubrication oil having been pressurized by the first booster pump and having the pressure higher than atmospheric pressure.

13. The drive unit for the straddled vehicle according to claim 1, wherein the first booster pump is driven by the rotational force of the one of the rotational shafts of the engine main body unit and the transmission unit.

14. The drive unit for the straddled vehicle according to claim 13, wherein the first booster pump and the second booster pump are both driven by the rotational force of the one of the rotational shafts of the engine main body unit and the transmission unit.

15. The drive unit for the straddled vehicle according to claim 14, wherein the first booster pump and the second booster pump are provided side by side on a single shaft, the first booster pump includes a first booster pump main body and a first housing which houses the first booster pump main body, the second booster pump includes a second booster pump main body and a second housing which houses the second booster pump main body, and at least a part of the first housing is also at least a part of the second housing.

16. The drive unit for the straddled vehicle according to claim 13, wherein the first booster pump and the second booster pump are driven by rotational forces of mutually different rotational shafts among the rotational shafts of the engine main body unit and the transmission unit, respectively.

17. The drive unit for the straddled vehicle according to claim 13, wherein the engine main body unit includes a cam shaft and a balance shaft which are rotationally driven by the crankshaft, and at least one of the first booster pump or the second booster pump is driven by rotational force of the cam shaft or the balance shaft.

18. The drive unit for the straddled vehicle according to claim 13, wherein
at least one of the engine main body unit or the transmission unit includes at least one hydraulically-actuated device which is operated by the high-pressure shared lubrication oil obtained by pressurizing, by the second booster pump,
the part of the shared lubrication oil having been pressurized by the first booster pump and having the pressure higher than atmospheric pressure.

19. The drive unit for the straddled vehicle according to claim 1, wherein at least one of the engine main body unit or the transmission unit includes at least one hydraulically-actuated device which is operated by the high-pressure shared lubrication oil obtained by pressurizing, by the second booster pump, the part of the shared lubrication oil having been pressurized by the first booster pump and having the pressure higher than atmospheric pressure.

20. The drive unit for the straddled vehicle according to claim 19, wherein
the engine main body unit includes at least one combustion chamber, and a valve provided on a gas passages connected to any of the at least one combustion chamber, and
the at least one hydraulically-actuated device includes a variable valve timing device configured to change timings to open and close the valve.

21. The drive unit for the straddled vehicle according to claim 19, wherein
the engine main body unit includes a cam shaft, a cam rotational body provided on the cam shaft, a crank rotational body provided on the crankshaft, and a winding member wound onto the cam rotational body and the crank rotational body, and
the at least one hydraulically-actuated device includes a tensioner device configured to impart tension to the winding member.

22. The drive unit for the straddled vehicle according to claim 19, wherein
the engine main body unit includes at least one combustion chamber, and a valve provided on a gas passage connected to any of the at least one combustion chamber, and a pressing member pressing the valve in an opening direction, and
the at least one hydraulically-actuated device includes a lash adjuster which is provided between the valve and the pressing member and is always in contact with the valve and the pressing member.

23. The drive unit for the straddled vehicle according to claim 19, wherein
the engine main body unit includes at least one combustion chamber, and a valve provided on a gas passage connected to any of the at least one combustion chamber, and a pressing member pressing the valve in an opening direction, and
the at least one hydraulically-actuated device includes a lash adjuster which is configured to press the pressing member in the opening direction so as to cause the valve to always be in contact with the pressing member.

* * * * *